(12) United States Patent
Carlstedt et al.

(10) Patent No.: US 8,196,912 B2
(45) Date of Patent: Jun. 12, 2012

(54) RAILCAR ELASTOMERIC SPRING

(75) Inventors: Richard A. Carlstedt, Wheaton, IL (US); Rodney K. Chesley, North Aurora, IL (US); Erik D. Jensen, Batavia, IL (US); David M. Houck, Montgomery, IL (US)

(73) Assignee: Miner Enterprises, Inc., Geneva, IL (US)

( * ) Notice: Subject to any disclaimer, the term of this patent is extended or adjusted under 35 U.S.C. 154(b) by 455 days.

(21) Appl. No.: 12/460,538

(22) Filed: Jul. 21, 2009

(65) Prior Publication Data

US 2010/0059470 A1  Mar. 11, 2010

Related U.S. Application Data

(60) Provisional application No. 61/191,560, filed on Sep. 10, 2008.

(51) Int. Cl.
*F16F 1/40* (2006.01)
(52) U.S. Cl. ..... 267/294; 267/153; 267/201; 267/141.1; 213/32 A; 213/40 D; 213/22; 213/44
(58) Field of Classification Search ............ 267/141.1, 267/153, 141, 292, 293, 294, 201; 188/250 G, 188/250 B; 213/32 A, 32 B, 32 C, 40 R, 213/40 D, 44
See application file for complete search history.

(56) References Cited

U.S. PATENT DOCUMENTS

| | | | |
|---|---|---|---|
| 3,677,535 A * | 7/1972 | Beck | 267/294 |
| 3,729,101 A * | 4/1973 | Brambilla et al. | 213/45 |
| 3,966,057 A * | 6/1976 | Duquette et al. | 213/22 |
| 4,198,037 A | 4/1980 | Anderson | |
| 4,566,678 A | 1/1986 | Anderson | |
| 4,569,424 A * | 2/1986 | Taylor, Jr. | 188/250 G |
| 4,591,059 A * | 5/1986 | Hammarlund | 213/32 R |
| 4,756,512 A | 7/1988 | Toms, Jr. | |
| 4,997,171 A | 3/1991 | Toms, Jr. | |
| 4,998,997 A | 3/1991 | Carlston | |
| 5,104,101 A | 4/1992 | Anderson et al. | |
| 5,335,403 A | 8/1994 | Jensen | |
| 5,351,844 A | 10/1994 | Carlstedt | |
| 6,478,173 B2 | 11/2002 | Carlstedt | |
| 6,488,162 B1 | 12/2002 | Carlstedt | |

(Continued)

OTHER PUBLICATIONS

DuPont de Nemoirs and Company; Hytrel thermoplastic polyester elastomer; Design Guide—Module V; 2003; pp. 1 through 58; USA.

*Primary Examiner* — Robert A Siconolfi
*Assistant Examiner* — Mariano Sy
(74) *Attorney, Agent, or Firm* — Law Office of John W. Harbst

(57) ABSTRACT

A cold formed railcar spring including a spring pad formed from a perform of thermoplastic polyester elastomer having a durometer hardness ranging between about 40 and about 45 on the Shore D scale and sandwiched between a pair of metal plates. Each metal plate has a generally centralized bore extending therethrough and includes a plurality of radially spaced mechanical fasteners formed as an integral part of each plate. Each fastener has first and second generally parallel surfaces and a barb extending from a side of the fastener such that, upon axial compression of the preform, the fastener is pressed axially inward of one end of the perform such that the barb on the fastener mechanically interlocks with the spring pad whereby securing the plate to the spring pad.

17 Claims, 12 Drawing Sheets

U.S. PATENT DOCUMENTS

| | | |
|---|---|---|
| 6,520,360 B1 | 2/2003 | Withall et al. |
| 6,796,448 B1 | 9/2004 | Wilt et al. |
| 6,860,368 B2 * | 3/2005 | Kulis et al. ................ 188/250 B |
| 7,624,884 B2 * | 12/2009 | Palermo et al. ................ 213/22 |
| 7,857,273 B2 * | 12/2010 | Sprainis et al. ............... 248/300 |

* cited by examiner

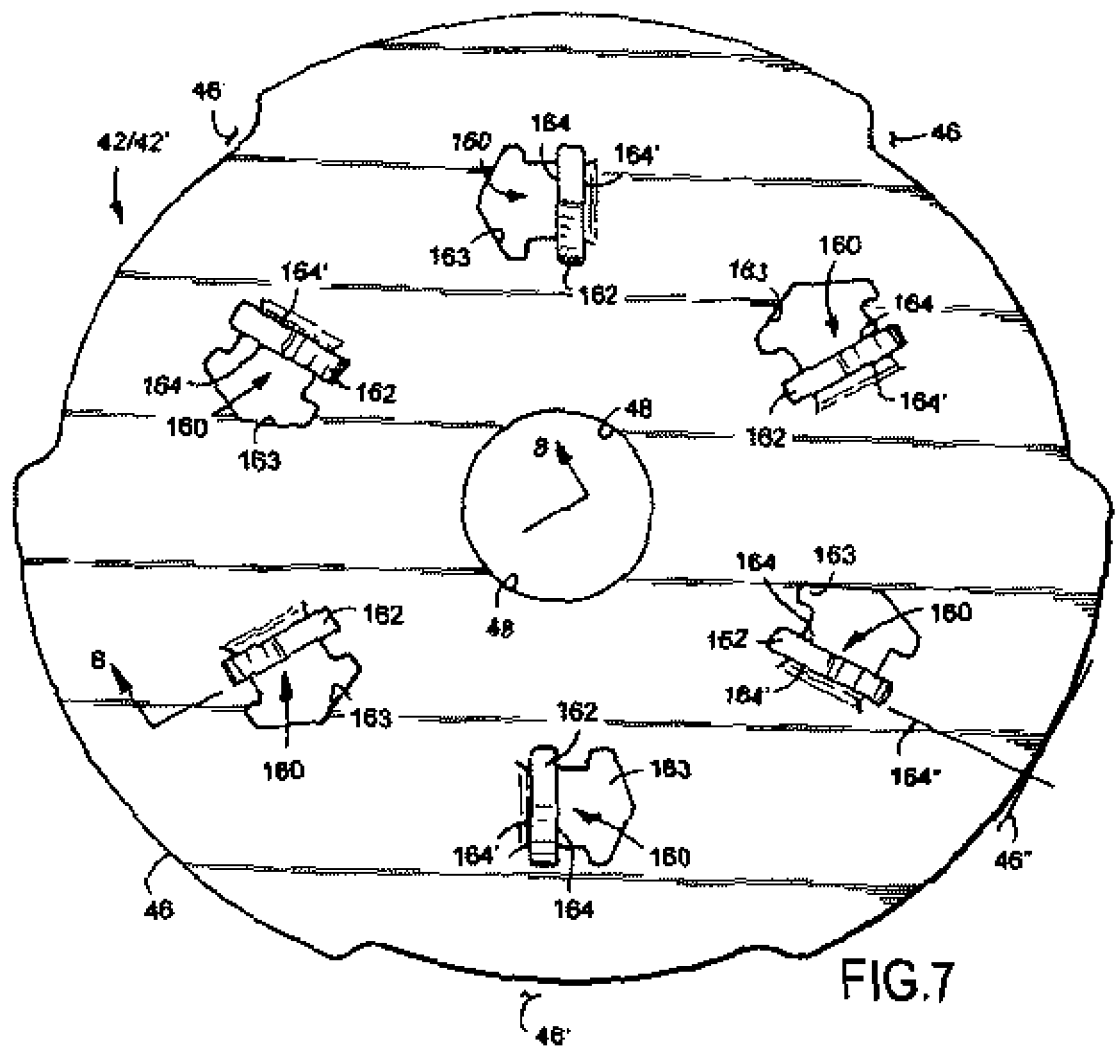
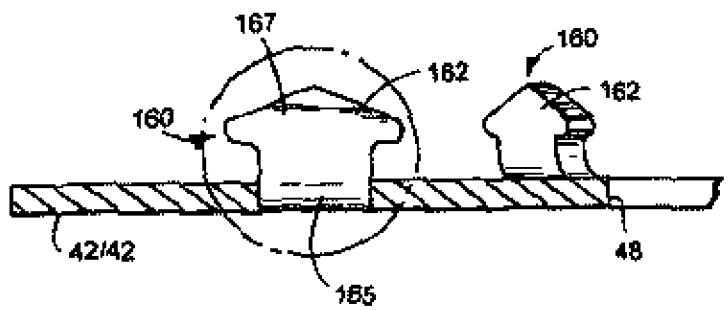
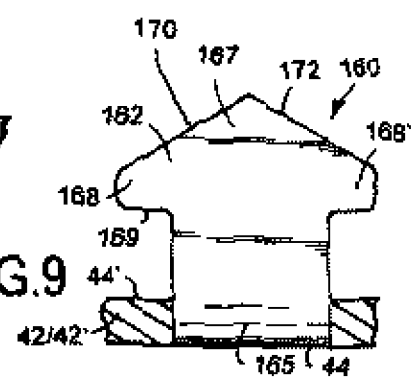
FIG. 7
FIG. 8
FIG. 9

RAILCAR ELASTOMERIC SPRING

RELATED APPLICATION

This application claims the benefit of provisional patent application Ser. No. 61/191,560; filed on Sep. 10, 2008.

FIELD OF THE INVENTION DISCLOSURE

The present invention disclosure generally relates to railcar draft gears and, more particularly, to an elastomeric spring used to absorb, dissipate and return energy imparted to a railcar draft gear.

BACKGROUND

Coupler systems for modern railroad cars typically include a draft gear assembly for cushioning and absorbing impact forces placed on the system during railcar operations. A conventional draft gear assembly includes an axially elongated housing having a friction clutch or other form of frictional restraint device arranged at one end thereof. A conventional draft gear assembly further includes an elastomeric spring package operably coupled to the friction clutch to absorb, dissipate and return energy imparted thereto during railcar operations.

A conventional elastomeric spring package used in a draft gear assembly includes a series of elastomeric springs arranged in axially stacked relation relative to each other. Each elastomeric spring includes an elastomeric pad having metal plates joined or bonded to opposite ends thereof. Testing has shown, the overall impact absorbing capabilities of each elastomeric spring are affected not only by the elastomeric spring pad design, but by the surface contact and the bonding of the metal plates to the spring pad.

One of the more useful elastomers for forming such railcar elastomeric springs is a thermoplastic polyester elastomer of the type sold by E. I du Pont de Nemoures & Co. under the trademark HYTREL®. Of course, similar elastomers may be produced and sold by other companies. In actual practice, HYTREL® 5550, 5555, 5556HS and 4056 elastomer composites have been used to form elastomeric springs for railcar draft gears. The first two numbers of those elastomeric composites signify the durometer hardness on the Shore D scale.

Generally, HYTREL® has inherent physical properties making it unsuitable for use as a compression spring. Applicants' Assignee, however, discovered a process by which the thermoplastic polyester material used to form the spring pad can be treated for rendering the elastomer suitable as a compression spring. Generally, that treatment, to convert the elastomer into a compression spring comprises the application of a compressive force to an elastomeric preform thereby compressing the preform in an axial direction to an extent greater than 30% of the initial axial length of the preform, measured in the direction of the applied pressure, and thereafter maintaining the preform under compression at a predetermined height for a predetermined dwell period, and then releasing the axial compression on the preform.

Research by Applicants' Assignee has revealed the provision of a central core or opening in the preform, before the application of the axial compressive force to the preform, has substantial beneficial affects on the resultant compression spring. The use of the hollow compression elastomeric spring is enhanced by changing the spring characteristics and thereby enlarging the scope of the applications where such a spring can be utilized. Moreover, providing a central core or opening in the compression spring affords the elastomeric spring with other advantages. For example, the provision of a core opening extending axially through the preform before the application of a compressive force thereto has been found not to cause the sidewalls of the spring to collapse as may be expected. Rather, the sidewalls of the spring and the core opening expand radially outward in a transverse direction when an axial compressive force is applied to the spring. Suffice it to say, the sidewalls of the spring are generally uniform in thickness and symmetrical about the axial centerline or axis of the spring. Moreover, the central bore or opening allows an axially elongated guide rod to be utilized within the draft gear housing thereby facilitating stacking and alignment of the series of elastomeric compressive springs within the draft gear housing.

Various methods have been proposed for securing the metal plates to the elastomeric pad. One method for securing the metal plates to the elastomeric pad is disclosed in U.S. Pat. No. 4,198,037 to D. G. Anderson. This method involves forming one face of each metal plate with surface incongruities. The surface incongruities on each plate are pressed into the ends of a previously formed preform that has already been transmuted into a compression spring. Another method for securing the metal plates to the elastomeric pad is disclosed in U.S. Pat. No. 5,351,844 to R. A. Carlstedt. This method involves providing a boss with an internal flange defining an aperture on each plate. According to this method, and during the axial compression step utilized to transmute the preform into the compression spring, the aperture in each plate receives a central projection provided at each end of the elastomeric preform.

Either and/or both of the above-listed methods for securing the metal plates to the elastomeric pad work well, especially when the thermoplastic polyester elastomer used to form the spring has a Shore D hardness rating of greater than 50. When the elastomer used to form the elastomeric spring has a durometer in the range of about 40 to 45 on the D hardness scale, however, the method disclosed in the above-mentioned '037 Anderson patent requires either repeated axial compression of the elastomer or a longer dwell period in order to enable the elastomer to form about the surface incongruities in a manner satisfactorily securing the metal plate to the elastomer pad. Even when the compression step is repeated, however, the ability of the elastomeric spring having a durometer in the range of about 40 to 45 on the D hardness scale to bond to the metal plates is wanting and frequently fails. Of course, having to repeat axial compression of the spring to accomplish adhesion between the metal plate and elastomer requires time and, thus, increases manufacturing costs. Moreover, inadvertent separation of the plates from the elastomeric spring pad simply cannot be tolerated. The method disclosed in the above-mentioned '844 Carlstedt patent is not particularly suited for use with compression springs having a central bore or opening extending therethrough.

As mentioned, the elastomeric spring package for the railcar draft gear is arranged within a housing and operably combines with the friction clutch to absorb, dissipate and return energy imparted thereto during railcar operation. During operation of the draft gear, heat generated by the friction clutch is imparted to the those elastomeric springs arranged in proximate relation to the friction clutch. As a result, and especially in those springs utilizing an elastomer having a durometer hardness ranging between 40 and 45 on the D hardness scale, the thermoplastic elastomer of those springs tends to radially expand toward an inner surface of the draft gear housing upon axial compression of the spring package. When the elastomer of the spring rubs or otherwise engages within the inner surface of the railcar housing, performance of the elastomeric spring is adversely affected. In extreme cases, and largely due to continued rubbing of the outer surface of the elastomer against the inner surface of the draft gear housing, one or more of the elastomeric springs can fail resulting in poor draft gear performance.

Thus, there is a continuing need and desire for a railcar elastomeric spring having a hollow elastomeric spring member formed from a thermoplastic polyester elastomer having a durometer hardness ranging between about 40 and about 45 on the Shore D scale and which is securely fastened to a pair of metal plates and is preferably configured to resist radial expansion beyond predetermined limits in response to axial compression of the spring.

BRIEF SUMMARY

In view of the above, and according to one aspect there is provided a cold formed railcar spring including a spring member formed from a preform of thermoplastic polyester elastomer having a durometer hardness ranging between about 40 and about 45 on the Shore D scale. The preform has an initial axial length and a generally cylindrical shape of a predetermined diameter between first and second axial ends thereof and defines an axial bore. The elastomer of the preform is such that, upon being axially compressed at least 30% of the initial axial length thereof, the elastomer will permanently retain a substantial portion of the length reduction after being compressed and whereby the preform is thereafter transmuted into the spring member for absorbing, dissipating and returning energy imparted thereto. The railcar spring also has first and second metal plates mechanically fastened at the first and second ends, respectively, of the preform. Each plate has a generally centralized bore extending therethrough. Each plate further includes a plurality of radially spaced mechanical fasteners formed as an integral part of each plate. Each fastener has first and second generally parallel surfaces and a barb along a length thereof such that, upon axial compression of the preform, the fastener is pressed axially inward of one end of the preform such that the barb on the fastener mechanically interlocks with the elastomer of the preform whereby fastening the plate to one end of the preform.

Preferably, each plate of the elastomeric spring further includes a plurality of surface incongruities extending away from the same planar surface as the fasteners and arranged in alternating radial relation relative to the fasteners. In one form, each fastener includes a shank portion and a head portion, with the shank portion of each fastener being joined to and extending from the plate, and with a size differentiation between the shank portion and the head portion defining the barb on the fastener.

In a preferred embodiment, a distal end of the head portion of each fastener has a slanted configuration to promote penetration of the fastener into the end of the preform upon axial compression of the preform. In another preferred embodiment, the shank portion of each fastener has a line of weakness for allowing the fastener to separate from the plate during working of the spring.

Each fastener preferably has a generally rectangular cross-sectional configuration along a majority of the length thereof. Moreover, each fastener is preferably oriented relative to the central axis of the preform to influence radial expansion of the spring member during a working cycle of the spring.

According to another embodiment, there is provided a cold formed railcar spring including a spring member formed from a preform of thermoplastic polyester elastomer having a durometer hardness ranging between about 40 and about 45 on the Shore D scale. The preform has an initial axial length and a generally cylindrical shape of a predetermined diameter between first and second axial ends thereof and defines an axial bore opening to the ends. Preferably, the preform and the closed margin of the bore are each substantially uniform in cross section perpendicular to a central axis of the preform. The elastomer of the preform is such that, upon being axially compressed at least 30% of its initial axial length, the elastomer will permanently retain a substantial portion of the length reduction and whereby the preform is thereafter transmuted into the spring member for absorbing, dissipating and returning energy imparted thereto. A pair of metal plates are adapted to be mechanically fastened at the ends of the preform. Each plate defines a generally centralized bore extending therethrough. Moreover, each plate further includes a plurality of radially spaced mechanical fasteners formed as an integral part of each plate and extending at an acute angle relative to a planar surface on each plate. Each fastener is arranged in predetermined relation about a diameter of the preform at opposite ends thereof such that, upon axial compression of the preform, a portion of the deforming elastomer radially expands and presses into mechanically interlocking relation with a distal end of each fastener whereby fastening each plate to one end of the preform.

Each plate furthermore preferably includes a plurality of surface incongruities extending away from the same planar surface as the fasteners and arranged in alternating radial relation relative to the fasteners. In a preferred embodiment, each fastener is orientated relative to the central axis of the preform to influence radial expansion of the spring member during a working cycle of said spring.

In accordance with another aspect, there is provided a cold formed railcar spring including a spring member formed from a preform of thermoplastic polyester elastomer having a durometer hardness ranging between about 40 and about 45 on the Shore D scale. The preform has an initial axial length and a generally cylindrical shape of a predetermined diameter between first and second axial ends thereof and defines an axial bore opening to the ends. The preform and a closed margin of the bore are each substantially uniform in cross section perpendicular to a central axis of the preform. The elastomer of the preform is such that, upon being axially compressed at least 30% of its initial axial length, the elastomer will permanently retain a substantial portion of the length reduction and whereby the preform is thereafter transmuted into the spring member for absorbing, dissipating and returning energy imparted thereto. First and second metal plates are adapted to be mechanically fastened at the first and second ends, respectively, of the preform. Each metal plate defines a central bore extending through the plate and includes a plurality of radially spaced fasteners formed as an integral part of each plate. Each fastener on the metal plates has first and second generally parallel major surfaces extending generally normal to a planar surface on the plate, with each fastener being pressed axially into one end of the preform, upon axial compression of the preform, so as to interlock with the elastomer of the preform whereby fastening the respective plate to one end of the preform. During a working cycle of the spring, each fastener is orientated to inhibit radial expansion of the elastomeric spring beyond predetermined limits.

Preferably, the generally centralized bore defined by each plate has a closed marginal edge for guiding the plate along a guide bar during a working cycle of the spring. In one form, each plate further includes a plurality of surface incongruities extending away from the same planar surface as the fasteners and arranged in alternating radial relation relative to said fasteners.

In a preferred embodiment, the first and second major planar surfaces of each fastener extend away from a central axis of each plate generally parallel to a line that would generally bisect the plate into generally symmetrical halves. In another form, the first and second major planar surfaces of each fastener are offset from the central axis of each plate and are oriented generally perpendicular to a line generally bisecting the plate into generally symmetrical halves.

In one form, the fastener on each plate includes a shank portion and a head portion. The shank portion of each fastener is joined to and extending from the plate, and with a size differentiation between the shank portion and said head portion defining a barb on each fastener. Preferably, a distal end of the head portion of each fastener is configured to promote penetration of the fastener into the end of the preform upon axial compression of the preform. In one form, the shank portion of each fastener has a line of weakness for allowing the fastener to separate from the plate during working of the spring. In a most preferred form, each fastener has a generally rectangular cross-sectional configuration along a majority of the length thereof.

DETAILED DESCRIPTION OF THE DRAWINGS

FIG. 7 is a plan view of another form of metal plate used to form the compression spring illustrated in FIG. 2;

FIG. 8 is an enlarged sectional view taken along line 8-8 of FIG. 7;

FIG. 9 is an enlarged showing of that area encircled in phantom lines in FIG. 8;

DESCRIPTION OF THE INVENTION DISCLOSURE

Figure 1:
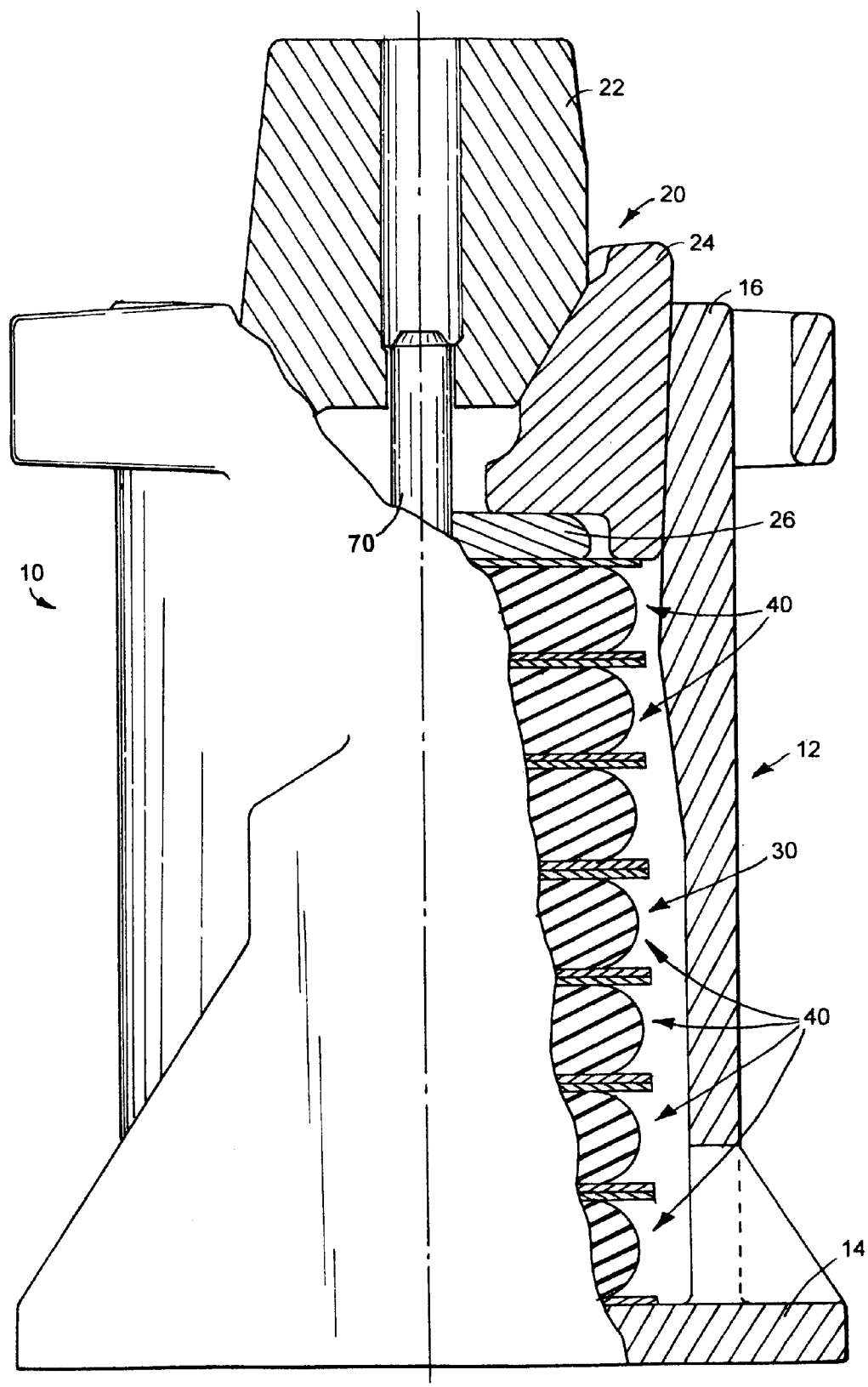
FIG. 1 is an illustrative elevational view of a railcar draft gear with parts broken away to show one form of elastomeric compression spring.

While the present invention disclosure is susceptible of embodiment in multiple forms, there is shown in the drawings and will hereinafter be described preferred embodiments, with the understanding the present disclosure is to be considered as setting forth exemplifications which are not intended to limit the disclosure to the specific embodiments illustrated and described.

Referring now to the drawings wherein like reference numerals indicate like parts throughout the several views, the railcar elastomeric spring of the present disclosure is illustrated in one of several intended environments. More specifically, in FIG. 1, the railcar elastomeric spring of the present disclosure is illustrated for use in a railcar draft gear assembly depicted in an upright position and generally identified by reference numeral 10. As known in the art, such railcar draft gear assemblies are normally arranged horizontally and within a railcar housing (not shown) for converting both tension and compression forces of a railcar coupler system (not shown) to a compressive force upon the draft gear.

Railcar draft gear assembly 10 includes an axially elongated and walled hollow housing 12 having a closed end 14 and an open end 16. Draft gear housing 12 is provided, toward open end 16, with three longitudinally extended and tapered internal surfaces (with only one being shown) converging toward the closed end 14 of the housing 12. A conventional friction clutch assembly, generally indicated by reference numeral 20, is arranged in operable combination with the open end 16 of housing 12 for absorbing energy imparted to the draft gear assembly 10 during railcar operation. Suffice it to say, the friction clutch assembly 20 includes a wedge 22, a portion of which extends axially beyond the open end 16 of the housing 12. When energy is imparted to the free end thereof, the wedge 22 is forced inwardly into the housing 12 to frictionally engage three or more friction shoes or members 24 (with only one being shown) also forming part of the clutch assembly 20. As the wedge 22 and shoes 24 are forced inwardly, friction forces generated through various inclined surfaces, absorb energy resulting from impacts.

An elastomeric spring package, generally indicated by reference numeral 30, operates in combination with the friction clutch assembly 20 to absorb, dissipate and return the very substantial energy imparted to the railcar draft gear assembly 10 during operation of the railcars, during their movement, and, more significantly, when the railcars are being coupled to form train units or consists in the railcar switching yards. As shown in FIG. 1, the spring package 30 is arranged within the hollow draft gear housing 12 between the closed 14 and the clutch assembly 20. As shown, one end of the spring package 30 acts against a generally flat spring seat 26.

Figure 2:
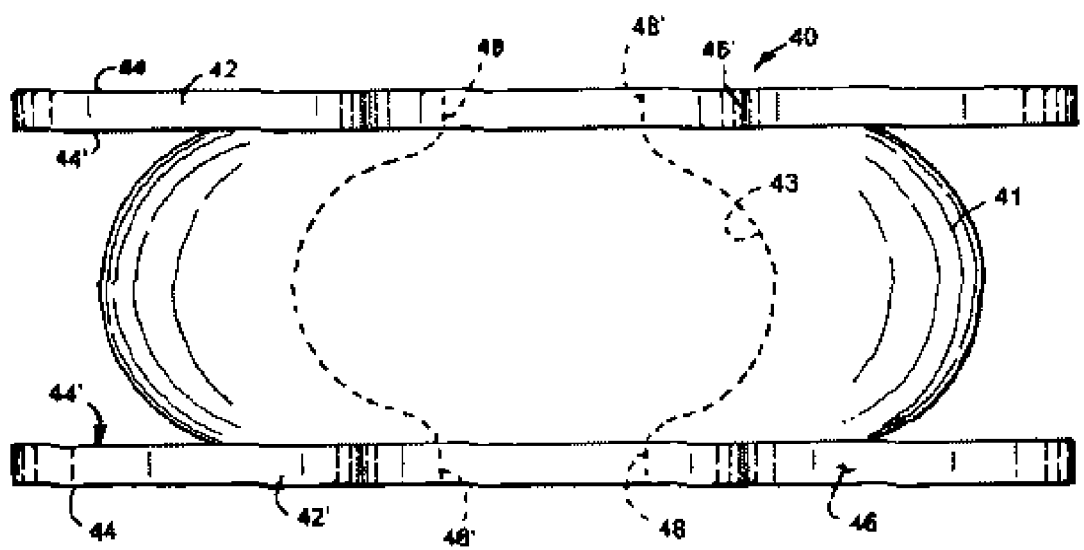
FIG. 2 is an elevational view of an elastomeric compression spring embodying principals of the present disclosure.

The elastomeric spring package 30 includes a series of cold formed elastomeric springs 40 which, as shown in FIG. 1, are compressed and stacked one upon the other between the closed end 14 of the draft gear housing 12 and the friction clutch assembly 20. As shown in FIG. 2, the majority of cold formed elastomeric springs 40 forming the spring package 30 includes an annular elastomeric spring pad 41 sandwiched between first and second plates 42 and 42', respectively. As shown in FIG. 2, each spring 40 defines a centrally disposed pilot hole or throughbore 43. When arranged within the draft gear housing 12, the pilot holes or bores of adjacent and stacked elastomeric springs are substantially aligned relative to each other. To facilitate axial alignment between the adjacent and stacked springs 40, draft gear assembly 12 can further include an axially elongated guide rod 70 (FIG. 1) extending between the closed end 14 of the draft gear housing 12 and extending toward the friction clutch assembly 20.

Figure 3:
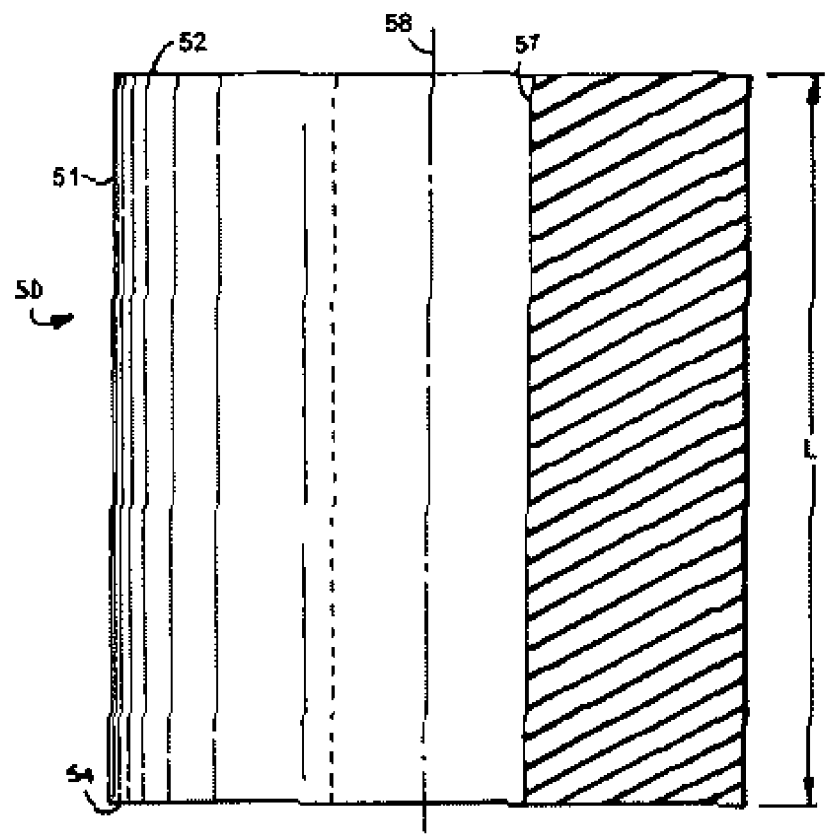
FIG. 3 is an elevational view of one form of a molded preform, partially shown in section, used in the elastomeric compression spring.

Each spring pad 41 is formed from an elastomeric preform 50. As shown in FIG. 3, the preform 50 has a selected initial axial length L and a generally cylindrical outer surface 51 of a predetermined and generally constant diameter between first and second generally parallel ends 52 and 54, respectively, thereof. Moreover, preform 50 defines an axial throughbore 57 opening to the first and second ends 52 and 54, respectively. Both the outer surface 51 of the preform 50 and an inner surface of the axial bore 57 are substantially uniform in cross-section perpendicular to a central axis 58 of the preform 50.

The preform 50 is preferably molded from an elastomer that is very durable, inert to reaction with grime, salt and corrosive fluids, and not subject to tear propagation. In a preferred form, the preform 50 has tensile characteristics such that the ratio of plastic strain to elastic strain is greater than 1.5 to 1, and, when operably secured to a metal plate, as set forth below, will form a more lasting durable bond that far exceeds the needs of even the demanding railcar industry. One such elastomer is of the type sold by DuPont de Nemoirs under the trademark HYTREL®. Of course, other types of elastomers can be used without detracting or departing from the spirit ands scope of this invention disclosure. For the particular application illustrated in FIG. 1, preform 50 is preferably molded from a thermoplastic polyester elastomer having a durometer hardness ranging between about 40 and about 45 on the Shore D hardness scale. As will be appreciated, the preform 50 can be successfully molded using any of several known techniques including: melt casting, injection molding and other techniques recommended by the DuPont Company and well known in the molding industry.

Figure 5:
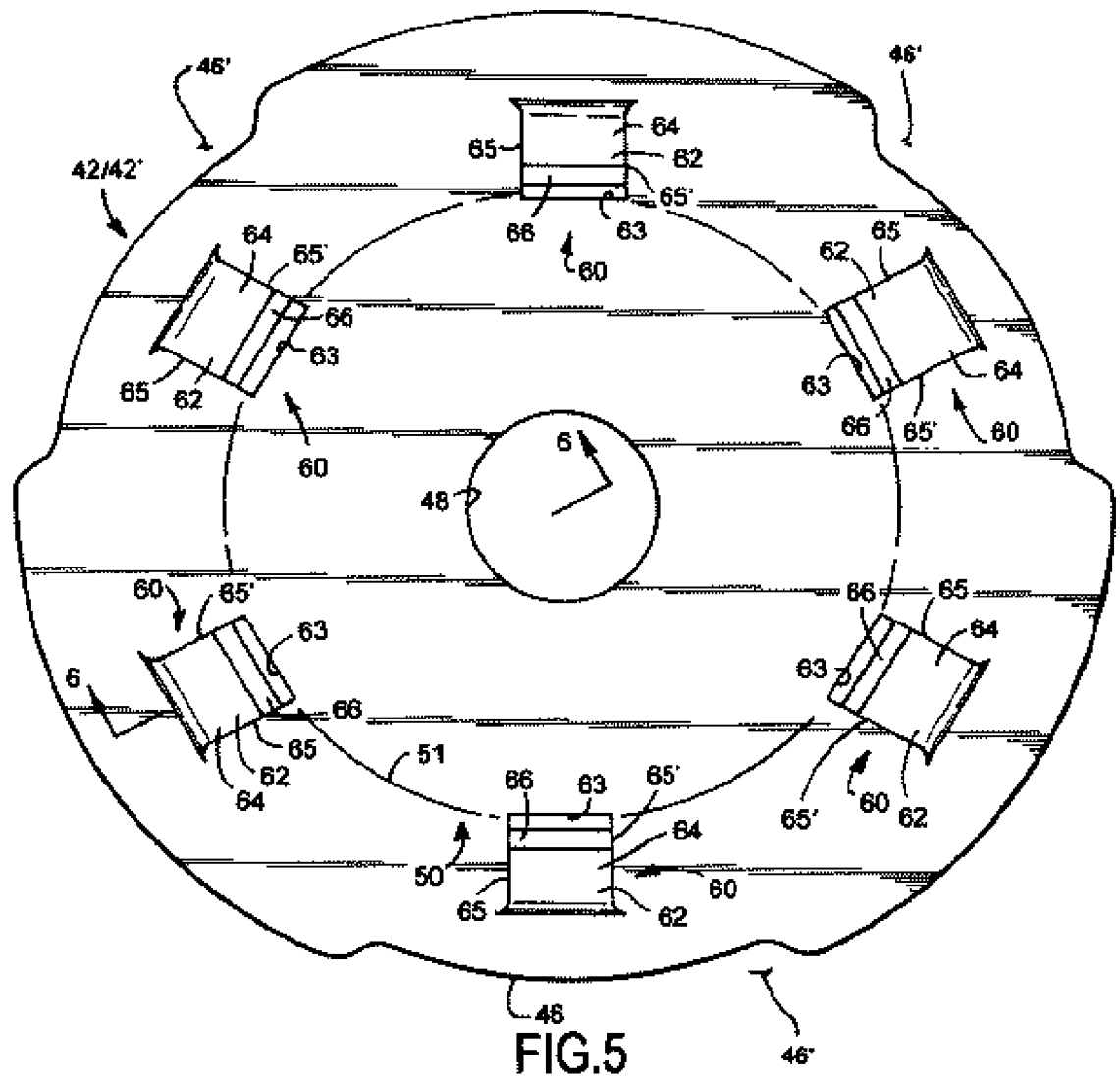
FIG. 5 is a plan view of one form of metal plate used to form the compression spring illustrated in FIG. 2.

The metal plates 42/42' of each spring 40 are substantially similar to each other. Each metal plate 42/42' is configured to be slidably received within the draft gear housing 12. Each plate 42/42' is preferably fabricated from a low-carbon, hot-rolled steel per ASTM A1011 and has a minimum hardness of Rockwell 65B. Returning to FIG. 2, to further reduce costs and to facilitate their fabrication as by a conventional stamping process, each plate 42/42' has an overall planar configuration defined by inner and outer or first and second generally parallel and planar major surfaces 44 and 44', respectively, having a predetermined thickness therebetween and with a profiled peripheral configuration 46 extending about the circumference of each plate. In the illustrated embodiment, the profiled peripheral configuration 46 of each plate 42/42' includes a plurality of equally spaced substantially identical reliefs 46' (FIG. 5).

When assembled, the reliefs 46' extending about the circumference of plate 42 align with the reliefs 46' provided about the circumference of plate 42'. As is known, the reliefs 46' in the plates 42/42' cooperate with appendages on the draft gear housing 12 to facilitate assembly of the spring 40 within the draft gear housing 12. As shown in FIGS. 2 and 5, each plate 42/42' also defines a centralized bore 48 having a closed margin 48' with a diameter slightly larger than a diameter of the guide rod 70 (FIG. 1) whereby facilitating axial sliding movement of the springs 40 axially along the guide rod 70 (FIG. 1) in response to an axial force or energy being applied to the draft gear assembly 10 (FIG. 1).

Figure 4:
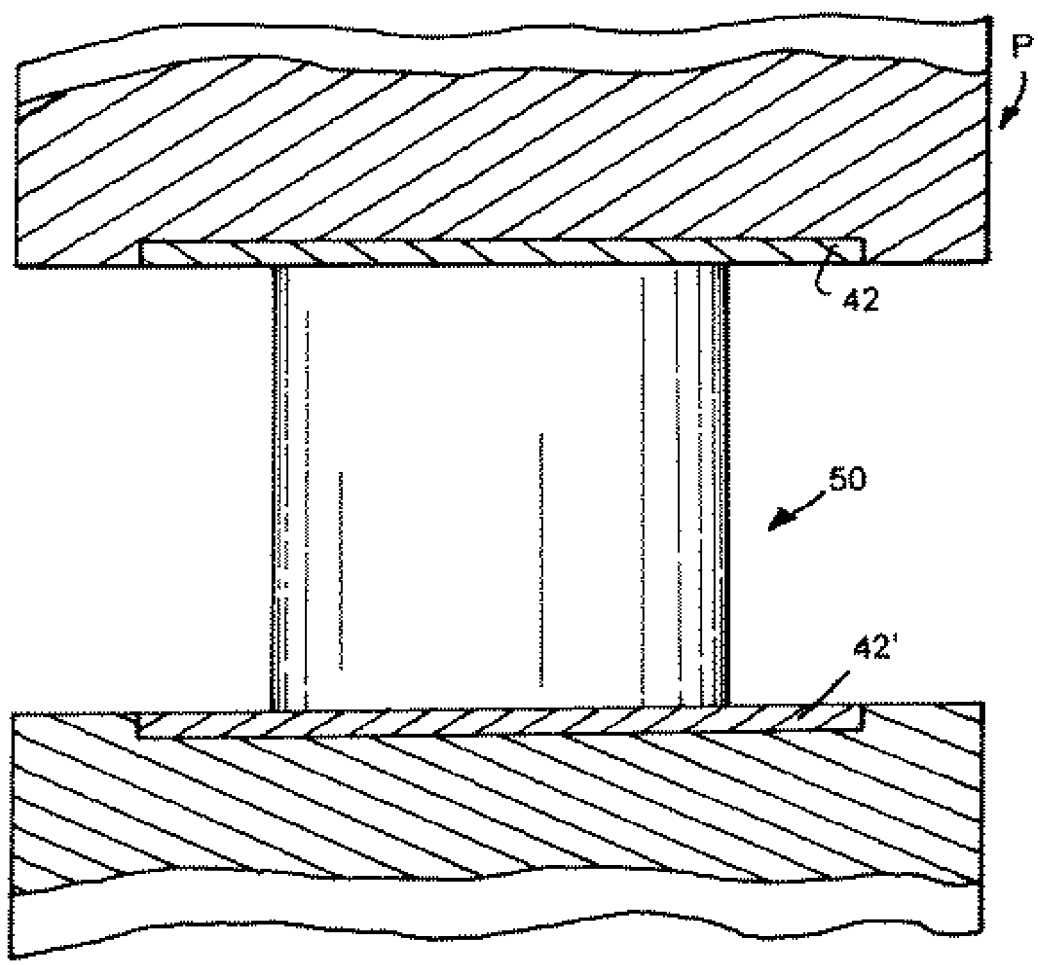
FIG. 4 is a schematic showing one of the steps used to form an elastomeric compression spring.

After the metal plates 42/42' have been stamped from coil or sheet metal and the preforms 50 have been molded, these components are cold formed into compression spring 40 in a hydraulic, mechanical or other form of press P (FIG. 4) capable of developing a relatively high compressive force. After placing and locating the plates 42/42' and preform 50 in the press P, the preform is worked in the press P. That is, and after placing and locating the plates 42/42' and preform 50 in the press P, press P is operated in a direction forcing plates 42/42' toward each other and with sufficient force to compress the preform 50 between the plates 42/42'. Preferably, preform 50 is worked by compressing the preform by at least 30% and, preferably by more than 50%, of its initial axial length L. During the working process, the compressive force F is applied to the preform 50 for a predetermined dwell period, and upon release, the preform 50 will return to a working height or length which is less than the initial axial length L.

Axial compression of the preform 50 within the press P causes the elastomer from which preform 50 is formed to take a permanent compression set and advantageously orientates the molecular structure of the elastomer. The preform 50 will take a "set" and thereafter will effectively act as a compression spring 40, i.e., upon subsequent applications of energy the elastomer of spring 40 will absorb, dissipate and return energy axially applied thereto. Without such compression, a HYTREL elastomer will not function properly as a compression spring.

While offering many advantages, forming the spring 40 from a thermoplastic polyester elastomer having a durometer hardness ranging between about 40 and about 45 on the Shore D hardness scale has presented several challenges. First, how to secure or otherwise fasten the plates 42/42' to the preform 50 such that, after working or compressing the preform, the plates 42/42' remain bonded or otherwise secured to the elastomer. Second, how to secure or otherwise fasten the plates 42/42' to the preform 50 without having to reapply compressive forces to the plates 42/42' and preform 50. Moreover, these Applicants were faced with the challenge of how to secure or otherwise fasten the plates 42/42' to the preform 50 so as to limit radial expansion of the elastomer material thus inhibiting the elastomer from rubbing against the interior of the draft gear housing 12 during operation of the railcar while increasing the capacity of spring 40.

In view of the above, each plate 42/42' is provided with a plurality of radially spaced fasteners preferably formed as an integral part of each plate 42/42'. The fasteners for mechanically bonding each plate 42/42' to the respective elastomeric spring pad 41 (FIG. 2) of each spring can take multiple forms without detracting or departing from the spirit and scope of the present disclosure.

Figure 6:
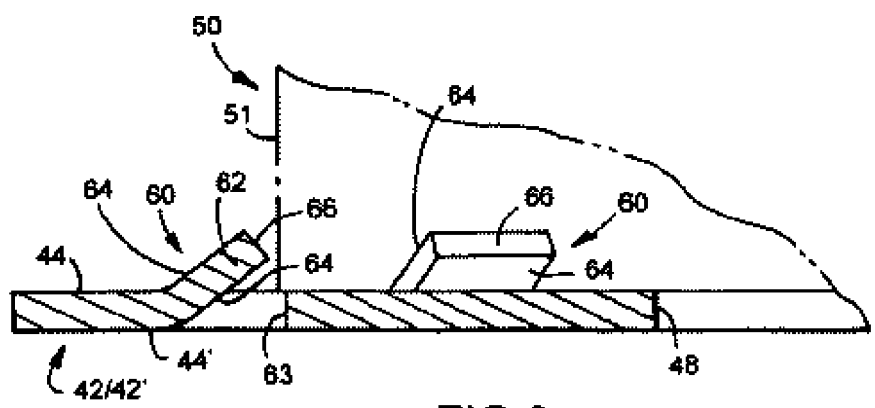
FIG. 6 is an enlarged sectional view taken along line 6-6 of FIG. 5.

The face of each plate 42/42' adapted to contact the spring pad 41 (FIG. 2) is provided with a series or plurality of fasteners 60 which, in the form shown in FIG. 5, are formed as tabs or elements 62 extending at an acute angle relative to that face of the plate 42/42' adapted to be engaged by the spring pad 41 (FIG. 2) and such that at least a lengthwise portion of each tab or element 62 is separated from and vertically overlies a portion of the plate 42/42'. The tabs 62 are stamped from or die cast with each plate 42/42' and, as such, are integral with each plate 42/42'. Preferably, and as shown in FIG. 6, each plate 42/42' further defines an aperture or opening 63 extending through the plate 42/42' and arranged in underlying relation relative to each tab 62. During the working phase, the elastomer of preform 50 plastically flows into the opening or aperture 63 arranged adjacent each tab or element 62 to facilitate the mechanical bond between the plates 42/42' and the pad 41.

As shown in FIG. 5, each tab or element 62 has a generally rectangular configuration. Preferably, each tab 62 has a first or upper planar and a second or lower major surfaces 64 and 64', respectively, extending parallel to each other and which are preferably separated by the same distance as opposed planar faces 44, 44' (FIG. 2) of each plate 42/42'. In the illustrated embodiment, surfaces 64 and 64' have a generally planar configuration. Moreover, in the fastener embodiment illustrated in FIG. 5, each tab or element 62 includes a pair of side edges 65, 65' which are separated by a distance ranging between about three to about five times the distance between the first and second major surfaces 64, 64' of each tab. In a most preferred form, the side edges 65, 65' of each tab are transversely separated by a distance of about four times the distance between the first and second major surfaces 64, 64' of each tab. Moreover, the tabs 62 are arranged about each plate 42/42' in concentric relation relative to a center of each plate and in generally diametrically opposed relation relative to each other. In the embodiment illustrated in FIG. 5, there are six equiangularly spaced fasteners 60.

Each fastener tab 62 also has a free distal end 66 spaced a predetermined radial distance from the center of each plate 42/42'. Notably, and as shown in FIG. 5, the distance between the distal ends 66 of two diametrically opposed fasteners 60 is equal to or only slightly greater than the outer diameter 51 of the preform 50 to be mechanically fastened to the plates 42/42'. During the working phase, the outer surface 51 of the preform 50 along with the end surfaces 52 and 54 tend to flow about the distal end 66 of each tab 62 and into a void 63 defined between the lower face 64' of each fastener 60 and that face of the plate 42/42' contacting the elastomer whereby establishing a mechanical bond between each plate 42/42' and the elastomeric pad 41.

Another form of fastener for mechanically securing or fastening each plate 42/42' to the respective elastomeric spring pad 41 is illustrated in FIGS. 7 through 9. The mechanical fasteners illustrated in FIG. 7 are designated generally by reference numeral 160. Fasteners 160 are formed as tabs or elements 162 and extend generally perpendicular relative to that planar face of the plate 42/42' adapted to be engaged by the spring pad of each spring. The tabs 162 are stamped from or die cast with each plate 42/42' and, as such, are integral with each plate 42/42'. Preferably, and as shown in FIG. 7, each plate 42/42' further defines an aperture or opening 163 extending through the plate 42/42' and arranged in proximate relation relative to each tab or element 162 and into which elastomer of the preform flows thereinto during the working phase thereby enhancing the bond between the plate and elastomeric preform. The tabs 162 are arranged about each plate 42/42' in concentric relation relative to the center of the plate 42/42' and in radially spaced relation from the center of the plate 42/42' by a distance greater than one-half the diameter of the centralized bore 48 and less than one-half the predetermined diameter 51 of the preform 50 (FIG. 3).

As shown in FIG. 7, each tab or element 162 preferably has first and second major and generally planar surfaces 164, 164' extending parallel to each other and which are preferably separated by the same distance as opposed planar faces 44, 44' (FIG. 2) of each plate 42/42' (FIG. 2). Turning to the fastener embodiment illustrated by way of example in FIG. 8, each tab or element 162 includes a shank portion 165 and a free ended and enlarged head portion 167. The shank portion 165 of each tab or element 162 is joined to and extends generally normal relative to the plate 42/42'. In the illustrated embodiment, the shank portion 165 of each fastener 160 has a generally rectangular configuration with a width, extending radially away from the center of the plate 42/42', ranging between about three to about five times the distance between the first and second major surfaces 164, 164' of each tab. In a most preferred form, the opposed side edges of each tab are transversely separated by a distance of about four times the distance between the first and second major surfaces 164, 164' of each tab. The tabs 162 are arranged in generally diametrically opposed relation relative to each other. In the embodiment illustrated in FIG. 7, there are six equiangularly spaced fasteners 160.

As illustrated in FIG. 7, the first and second major surfaces 164, 164' of each tab or element 162 extend away from the central axis of the metal plate and generally parallel to a line 164" generally bisecting the plate 42/42' into generally symmetrical halves.

As best illustrated in FIG. 9, a size differentiation between the shank portion 165 and the enlarged head portion 167 of each tab or element 162 provides each fastener 160 with a barb or projection 168 extending from at least one side the fastener 160. In the fastener embodiment illustrated by way of example in FIG. 9, a radial shoulder 169 is defined by the size differential between the shank portion 165 and head portion 167 of each tab 162. As shown, a portion of the radial shoulder 169 extends outwardly and away from the shank portion 165 of each element 162. In the embodiment shown in FIG. 8 the radial shoulder on fastener 160 extends generally parallel to and is spaced from the major surfaces 44, 44' (FIG. 2) of each metal plate 42/42'. In the illustrated embodiment, each fastener 160 includes two barbs 168, 168' extending outwardly in opposite parallel directions from opposed sides of each tab 162.

As illustrated by way of example in FIG. 9, the free or distal end of each fastener 160 is configured to promote penetration of the fastener 160 into the end of the preform when the preform 50 and plates 42/42' are squeezed to form a compression spring 40. In the fastener embodiment illustrated in FIG. 9, the free or distal end of the enlarged head portion 167 of each fastener 160 preferably includes two slanted surfaces 170 and 172. Surfaces 170 and 172 are preferably slanted in angularly opposed relation relative to each other to provide the free end of each fastener 160 with an arrow-like configuration. Preferably, the surfaces 170, 172 at the distal end of the enlarged head portion 167 of each fastener 160 are slanted in angularly opposed relation relative to each other so as to define an included angle ranging between about 100° and about 150° therebetween.

Figure 10:
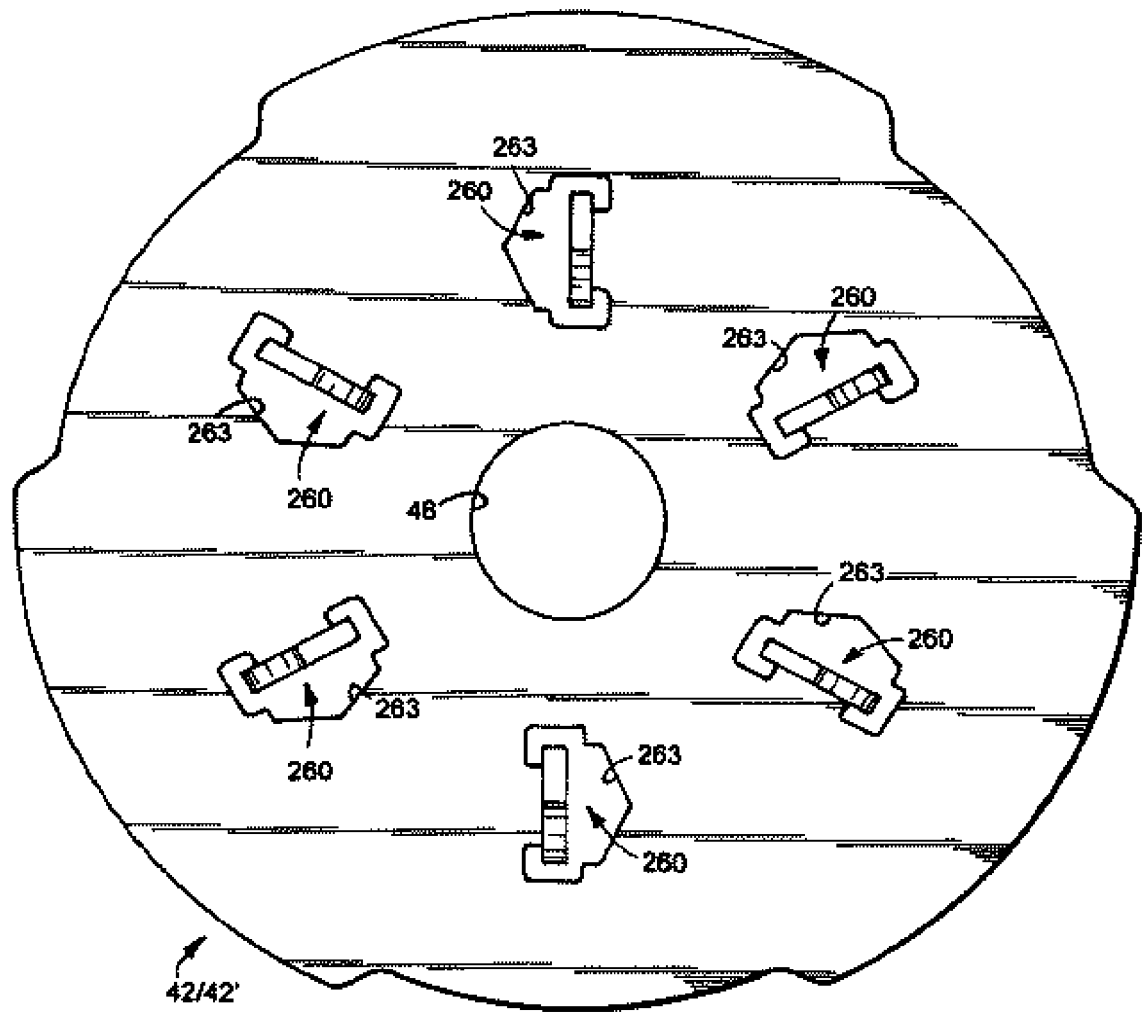
FIG. 10 is a plan view of still another form of metal plate used to form the compression spring illustrated in FIG. 2.

Another form of fastener for mechanically securing or fastening each plate 42/42' to the respective elastomeric spring pad 41 is illustrated in FIG. 10. The mechanical fasteners illustrated in FIG. 10 are designated generally by reference numeral 260. Suffice it to say, the fasteners 260 are designed substantially similar and are functionally analogous to the fasteners 160 discussed in detail above. In the fastener embodiment illustrated by way of example in FIG. 10, each plate 42/42' defines an aperture or opening 263 extending through each plate 42/42' in proximate relation relative to each tab or element 262 forming fastener 260.

In the fastener embodiment illustrated in FIG. 10, each aperture or opening 263 is slightly larger than the configuration of the fastener 260 arranged in proximate relation thereto and is also larger than the aperture or openings 163 arranged in proximate relation relative to the tabs or elements 162 of fasteners 160 (FIG. 7). Besides facilitating the process of manufacturing the plates 42/42' and, more particularly, the fasteners 260 on the plates 42/42', the increased size of the openings or apertures 263 in the plates 42/42' facilitates the flow of elastomer of the preform thereinto during the working phase formation of the compression spring whereby enhancing the mechanical securement of each plate 42/42' to the elastomer.

Figure 11:
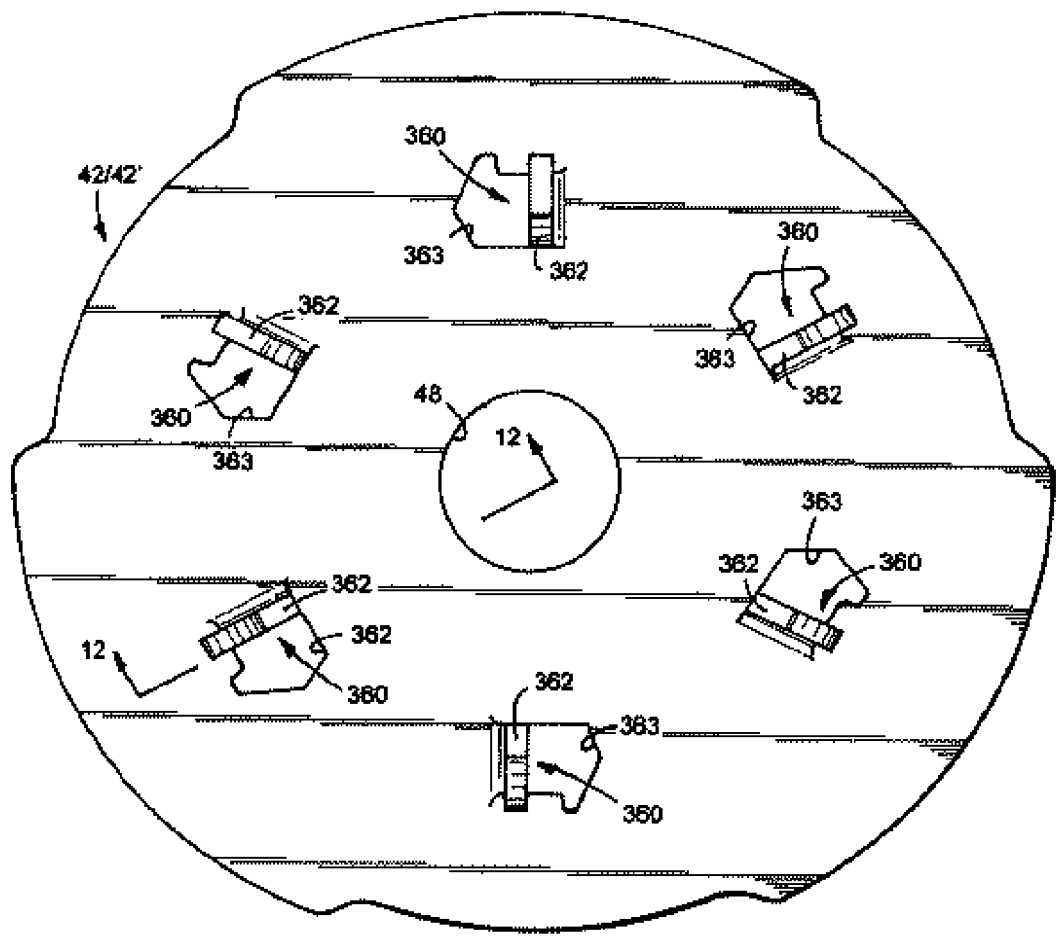
FIG. 11 is a plan view of yet another form of metal plate used to form the compression spring illustrated in FIG. 2.
Figures 12, 13:
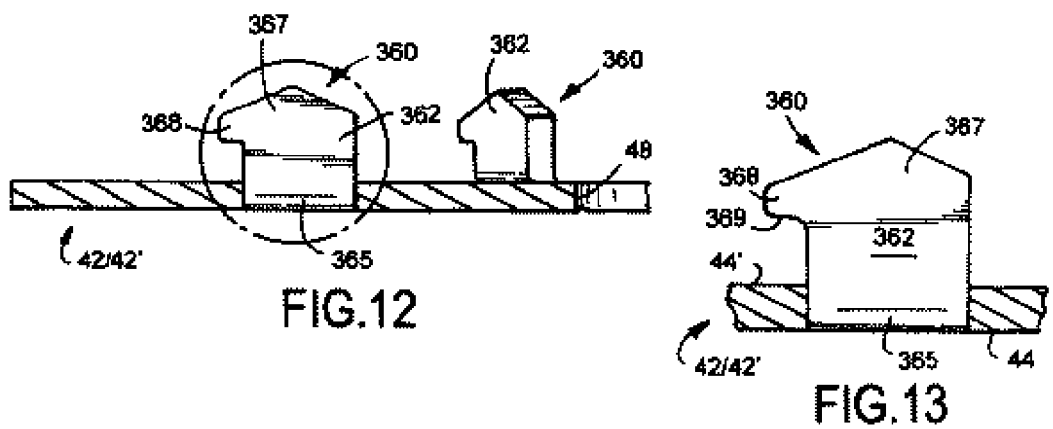
FIG. 12 is an enlarged sectional view taken along line 12-12 of FIG. 11.
FIG. 13 is an enlarged showing of that area encircled in phantom lines in FIG. 12.

Yet another form of fastener for mechanically securing or fastening each plate 42/42' to the respective elastomeric spring pad 41 is illustrated in FIGS. 11 through 13. The mechanical fasteners illustrated in FIG. 11 through 13 are designated generally by reference numeral 360. Suffice it to say, the fasteners 360 are designed substantially similar to the fasteners 160 discussed in detail above. As such, the elements or structure of the alternative fastener 360 that are functionally analogous to the structure of fastener 160 set forth above are designated by like reference numerals to those listed above.

In the fastener illustrated by way of example in FIGS. 12 and 13, the fasteners 360 are formed as tabs or elements 362 and extend generally perpendicular relative to that planar face of the plate 42/42' adapted to be engaged by the spring pad of each spring. The tabs 362 are stamped from or die cast with each plate 42/42' and, as such, are integral with each plate 42/42'. Preferably, and as shown in FIG. 11, each plate 42/42' further defines an aperture or opening 363 extending through the plate 42/42' and arranged in proximate relation relative to each tab or element 362. The tabs 362 are arranged about each plate 42/42' in concentric relation relative to the center of the plate 42/42' and in radially spaced relation from the center of the plate 42/42' by a distance greater than one-half the diameter of the centralized bore 48 and less than one-half the predetermined diameter of the preform 50.

Turning to the fastener illustrated by way of example in FIG. 13, each tab or element 362 has generally planar surfaces and includes a shank portion 365 and a free ended and enlarged head portion 367. The shank portion 365 of each tab or element 362 is joined to and extends generally normal relative to the plate 42/42'. In the illustrated fastener embodiment, the shank portion 365 of each fastener 360 has a generally rectangular configuration with a width, extending radially away from the center of the plate 42/42', ranging between about three to about five times the distance between first and second major surfaces 364, 364' of each tab. In a most preferred form, opposed side edges of each tab are transversely separated by a distance of about four times the distance between the first and second major surfaces 364, 364' of each tab. The tabs 362 are arranged in generally diametrically opposed relation relative to each other. In the embodiment illustrated in FIG. 11, there are six equiangularly spaced fasteners 160.

In the fastener illustrated by way of example in FIGS. 12 and 13, a size differentiation exists between the shank portion 365 and the enlarged head portion 367 of each tab or element 362. Such size differentiation provides each fastener 360 with a barb or projection 368 extending from at least one side of the fastener 360. In the embodiment illustrated by way of example in FIG. 13, a radial shoulder 369 is defined by the size differential between the shank portion 365 and head portion 367 of each tab 362. In the embodiment illustrated, a portion of the radial shoulder 369 extends outwardly and away from the shank portion 365 of the tab or element 362. In the embodiment shown in FIG. 13 the radial shoulder on fastener 360 extends generally parallel to and is spaced from the major surfaces of the metal plate 42/42'. In the illustrated embodiment, barb 368 extends or radiates outwardly and away from the central axis of the plate 42/42' from one side of each fastener 360 disposed the furthest radial distance from the central axis of the plate 42/42'.

Figure 14:
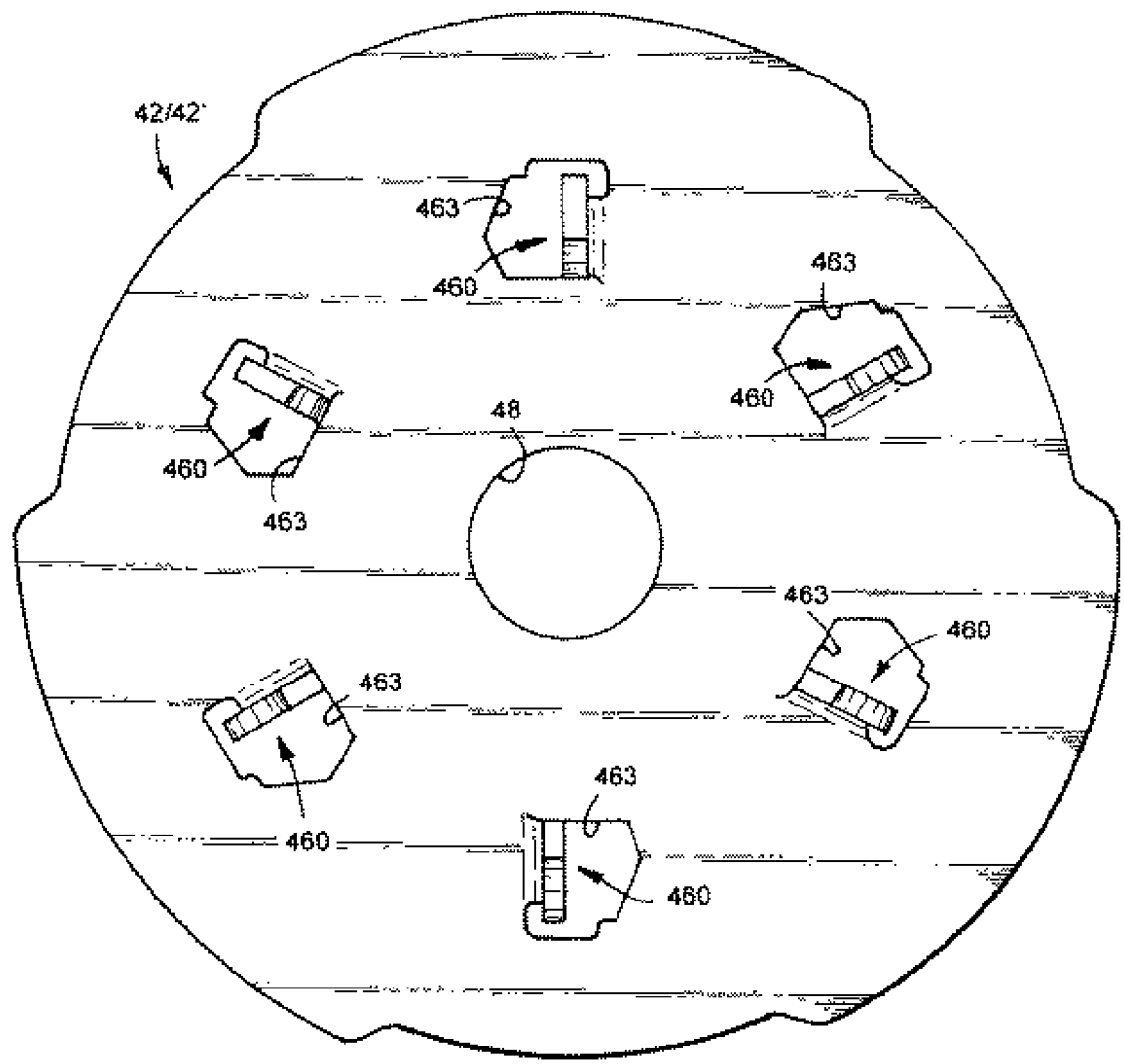
FIG. 14 is a plan view of still another form of metal plate used to form the compression spring illustrated in FIG. 2.

Still another form of fastener for mechanically fastening each plate 42/42' to the respective elastomeric spring pad 41 is illustrated in FIG. 14. The mechanical fasteners illustrated in FIG. 14 are designated generally by reference numeral 460. Suffice it to say, the fasteners 460 are designed substantially similar and are functionally analogous to the fasteners 360 discussed in detail above.

In the fastener illustrated by way of example in FIG. 14, each plate 42/42' defines an aperture or opening 463 extending through each plate 42/42' in proximate relation relative to each tab or element 462 forming fastener 460. In the embodiment of the plate 42/42' illustrated by way of example in FIG. 14, however, the aperture or opening 463 defined by and extending through each plate 42/42' in proximate relation relative to each tab or element 462 forming fastener 460 is slightly larger than the aperture or openings 363 arranged in proximate relation relative to the tabs or elements 362 of fasteners 360. Besides facilitating the process of manufacturing the plates 42/42' and, more particularly, the fasteners 460 on the plates 42/42', the increased size of the openings or apertures 463 in the plates 42/42' facilitates the flow of elastomer thereinto during the working phase formation of the compression spring whereby enhancing the mechanical securement of each plate 42/42' to the elastomer.

Figure 15:
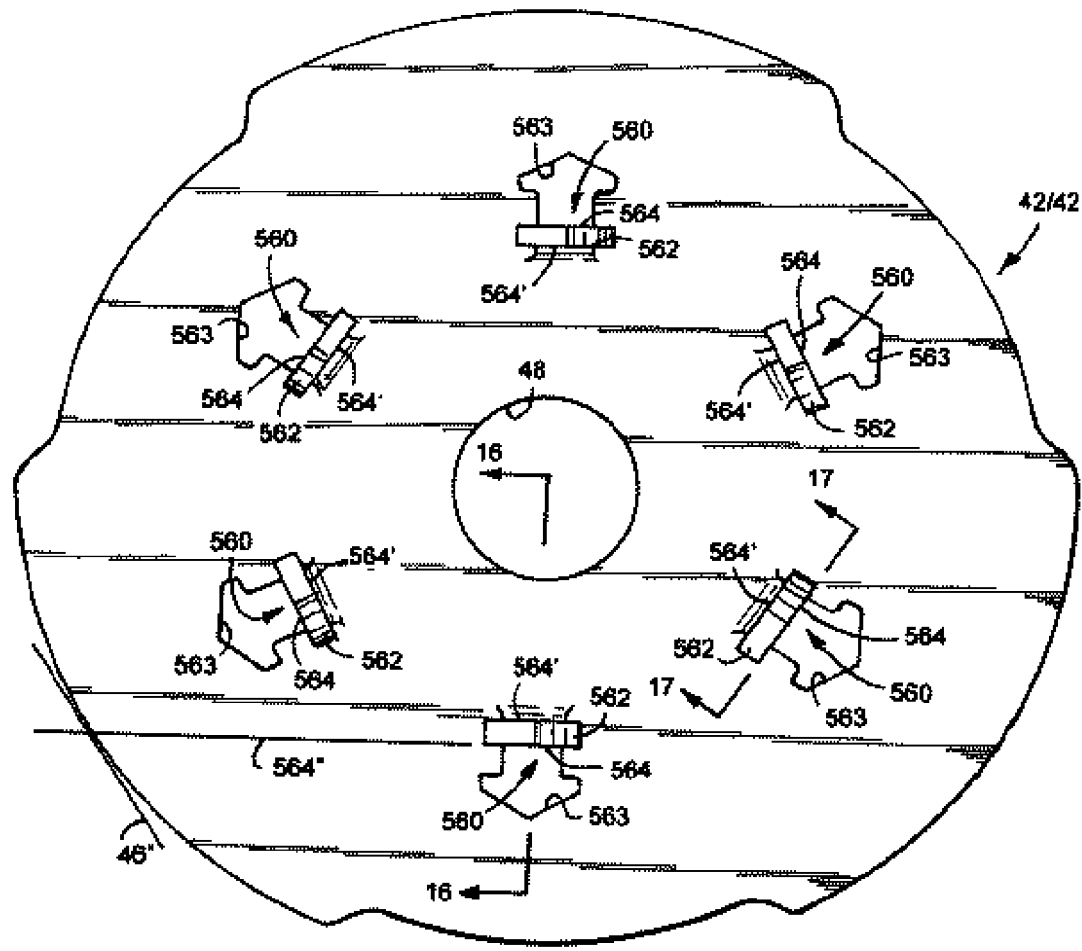
FIG. 15 is a plan view of still another form of metal plate used to form the compression spring illustrated in FIG. 2.
Figure 16:
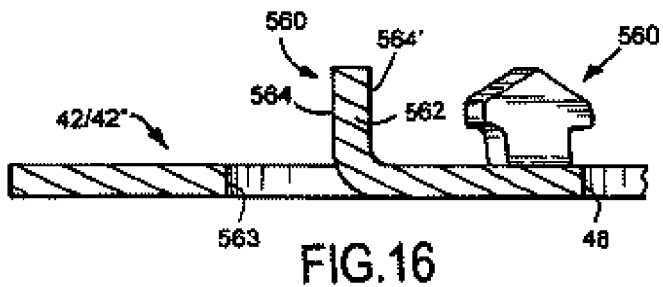
FIG. 16 is enlarged sectional view taken along line 16-16 of FIG. 15.
Figure 17:
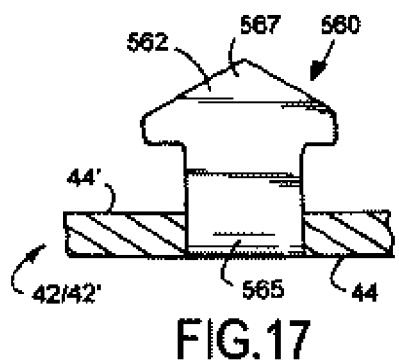
FIG. 17 is an enlarged sectional view taken along line 17-17 of FIG. 15.

Another form of fastener for mechanically securing or fastening each plate 42/42' to the respective elastomeric spring pad 41 is illustrated in FIGS. 15 through 17. The mechanical fasteners illustrated in FIGS. 15 through 17 are designated generally by reference numeral 560. Suffice it to say, the fasteners 560 are designed substantially similar to the fasteners 160 discussed in detail above. As such, the elements or structure of the alternative fastener 560 that are functionally analogous to the structure of fastener 160 set forth above are designated by like reference numerals to those listed above.

Fasteners 560 are formed as tabs or elements 562 and, as shown in FIG. 16, extend generally perpendicular to the planar face of the plate 42/42' adapted to be engaged by the spring pad of the spring. The tabs 562 are preferably stamped from or die cast with each plate 42/42' and, as such, the tabs 562 are integral with each plate 42/42'. Preferably, and as shown in FIG. 16, each plate 42/42' further defines an aperture or opening 563 extending through the plate 42/42' and arranged in proximate relation relative to each tab or element 562. The tabs 562 are arranged about each plate 42/42' in concentric relation relative to the center of the plate 42/42' and in radially spaced relation from the center of the plate 42/42' by a distance greater than one-half the diameter of the centralized bore 48 and less than one-half the predetermined diameter of the preform 50.

As shown in FIGS. 15 and 16, each tab or element 562 preferably has first and second major and generally planar surfaces 564, 564' extending parallel to each other and which are preferably separated by the same distance as opposed planar faces 44, 44' (FIG. 2) of each plate 42/42'. Regarding the fastener illustrated by way of example in FIG. 17, each tab 562 includes a shank portion 565 and a free ended and enlarged head portion 567. The fastener shank portion 565 is joined to and extends generally normal relative to the plate 42/42'. In the illustrated embodiment, the fastener shank portion 565 has a generally rectangular configuration with a width ranging between about three to about five times the distance between the first and second major surfaces 564, 564' of each tab. In a most preferred form, opposed side edges of each tab are transversely separated by a distance of about four times the distance between the first and second major surfaces 564, 564' of each tab. The tabs 562 are arranged in generally diametrically opposed relation relative to each other. In the embodiment illustrated in FIGS. 15, there are six equiangularly spaced fasteners 560.

As shown in FIG. 15, the first and second major surfaces 564, 564' of each tab or element 562 are offset from a central axis of the metal plate 42/42' and extend generally perpendicular to a line 564" bisecting each plate 42/42' into generally symmetrical halves. It should be readily appreciated, the angular disposition of the first and second major surfaces of each tab or element can be other than that shown and described without detracting or departing from the spirit and scope of the invention disclosure.

Figure 18:
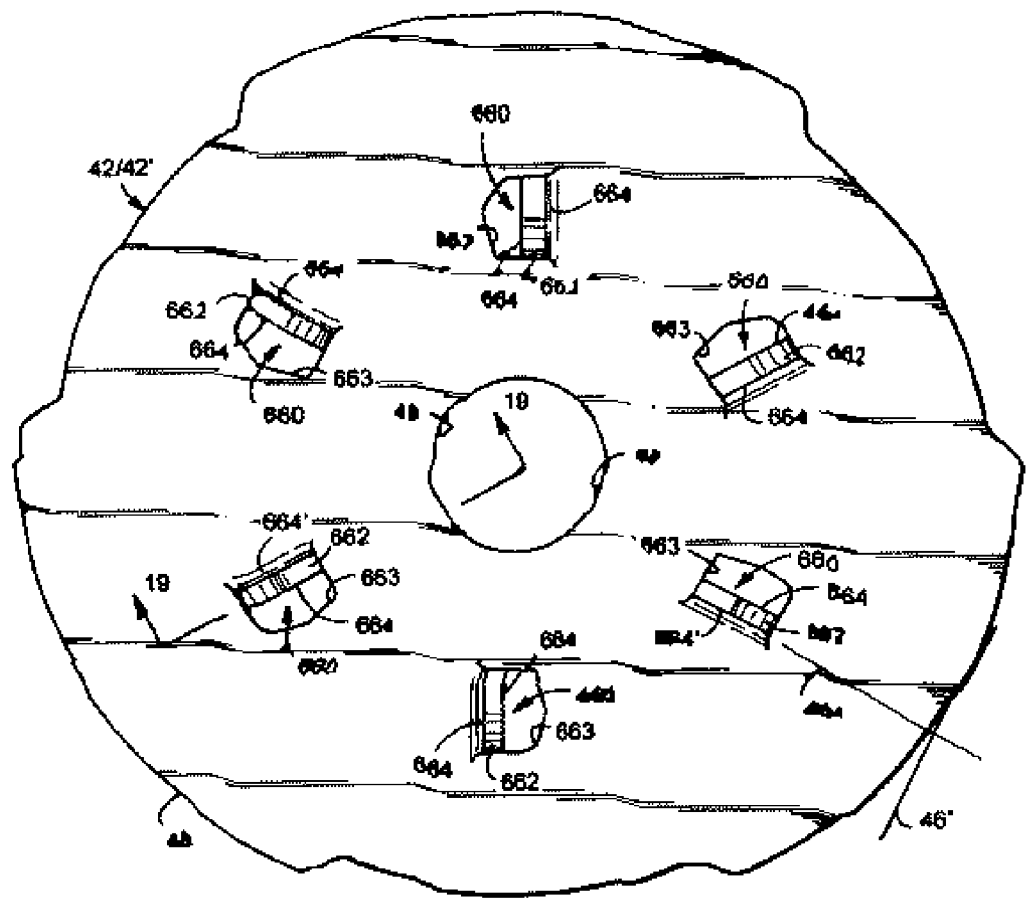
FIG. 18 is a plan view of yet another form of metal plate used to form the compression spring illustrated in FIG. 2.
Figure 19:
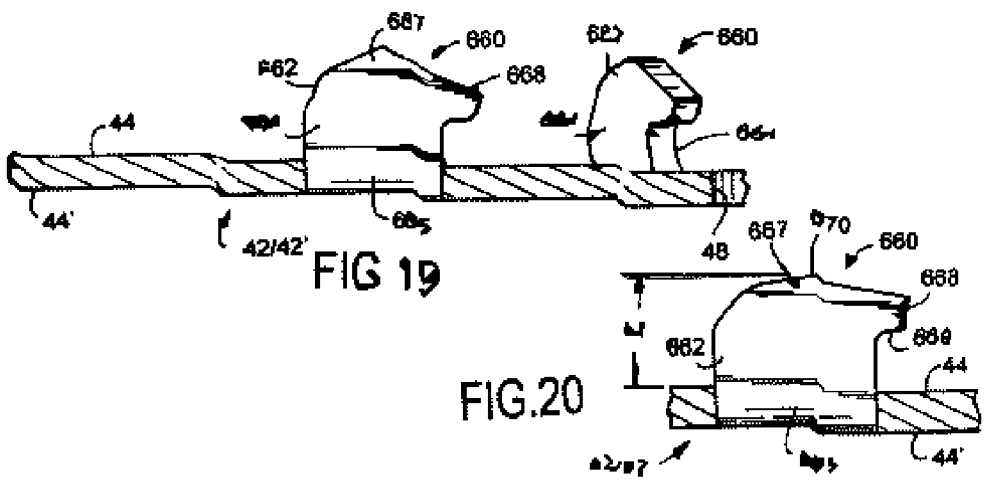
FIG. 19 is enlarged sectional view taken along line 19-19 of FIG. 18.
Figure 20:
FIG. 20 is an enlarged showing of that area encircled in phantom lines in FIG. 19.

Still another form of fastener for mechanically securing each plate 42/42' to the respective elastomeric spring pad 41 (FIG. 2) is illustrated in FIGS. 18 through 20. The mechanical fasteners illustrated in FIGS. 18 through 20 are designated generally by reference numeral 660. Suffice it to say, the fasteners 660 are designed substantially similar to the fasteners 160 discussed in detail above. As such, the elements or structure of the alternative fastener 660 that are functionally analogous to the structure of fastener 160 set forth above are designated by like reference numerals to those listed above.

Fasteners 660 are formed as tabs or elements 662 and extend generally perpendicular to the planar face of the plate 42/42' adapted to be engaged by the spring pad 41 (FIG. 2). The tabs 662 are stamped from or die cast with each plate 42/42' and, as such, are integral with each plate 42/42'. Preferably, and as shown in FIG. 18, each plate 42/42' further defines an aperture or opening 663 extending through the plate 42/42' and arranged in proximate relation relative to each tab or element 662. The tabs 662 are arranged about each plate 42/42' in concentric relation relative to the center of the plate 42/42' and in radially spaced relation from the center of the plate 42/42' by a distance greater than one-half the diameter of bore 48 and less than one-half the predetermined diameter of the preform 50 (FIG. 3).

As shown in FIG. 18, each tab or element 662 preferably has first and second major and generally planar surfaces 664, 664' extending parallel to each other and which are preferably separated by the same distance as opposed planar faces 44, 44' of each plate 42/42'. Turning to that embodiment of the plate 42/42' illustrated by way of example in FIGS. 19 and 20, each element 662 includes a shank portion 665 and a free ended and enlarged head portion 667. The fastener shank portion 665 is joined to and extends generally normal relative to the plate 42/42'. In the illustrated embodiment, the fastener shank portion 665 has a generally rectangular configuration with a width ranging between about three to about five times the distance between the first and second major surfaces 664, 664' (FIG. 18) of each tab. Preferably, opposed side edges of each tab are transversely separated by a distance of about four times the distance between the first and second major surfaces 664, 664' (FIG. 18) of each tab. The tabs 662 are arranged in generally diametrically opposed relation relative to each other. In the embodiment illustrated in FIGS. 18 through 20, there are six equiangularly spaced fasteners 660.

In the embodiment illustrated in FIG. 18, the first and second major surfaces 664, 664' of each tab or element 662 extend away from a central axis of the metal plate 42/42' and generally parallel to a line 664" which generally bisects plate 42/42' into generally symmetrical halves.

In the embodiment of the plate 42/42' illustrated by way of example in FIGS. 19 and 20, a size differentiation exists between the shank portion 665 and the enlarged head portion 667 of each tab or element 662. Such size differentiation provides each fastener 660 with a barb or projection 668 extending from at least one side of the fastener 660. In the embodiment illustrated by way of example in FIG. 20, a radial shoulder 669 is defined by the size differential between the shank portion 665 and head portion 667 of each tab 662. In the embodiment illustrated, a portion of the radial shoulder 669 extends away from the shank portion 665 of each tab or element 662. In the embodiment illustrated in FIG. 20, the radial shoulder 669 on fastener 660 extends generally parallel to and is spaced from the major surfaces of the metal plate 42/42'. In the embodiment illustrated in FIGS. 19 and 20, the barb 668 extends radially inwardly toward the central axis of plate 42/42' and from one side of the fastener 660.

In the embodiment illustrated by way of example in FIG. 20, the free or distal end of each fastener is configured with a generally planar surface 670 extending across the majority of the width of the fastener head portion 667. As in the other illustrated embodiments, and to optimize the overall operative length of the elastomeric spring whereby optimizing material flow during compression of the spring, the distance H the distal end of each tab 662 is disposed from the contact surface 44 of each plate 42/42' is equal to about 2.5 times to about four times the distance between major surfaces 664, 664' of each tab 662. In the embodiment illustrated in FIG. 20, the generally planar surface 670 at the distal end of the head portion 667 of each fastener 660 blends into a depending radius extending from that side of the shank portion 665 opposite from the barb 668 whereby promoting the movement of elastomer thereover and therepast as the elastomer of spring 40 retracts after the axial compression force acting thereon is removed therefrom.

Figure 21:
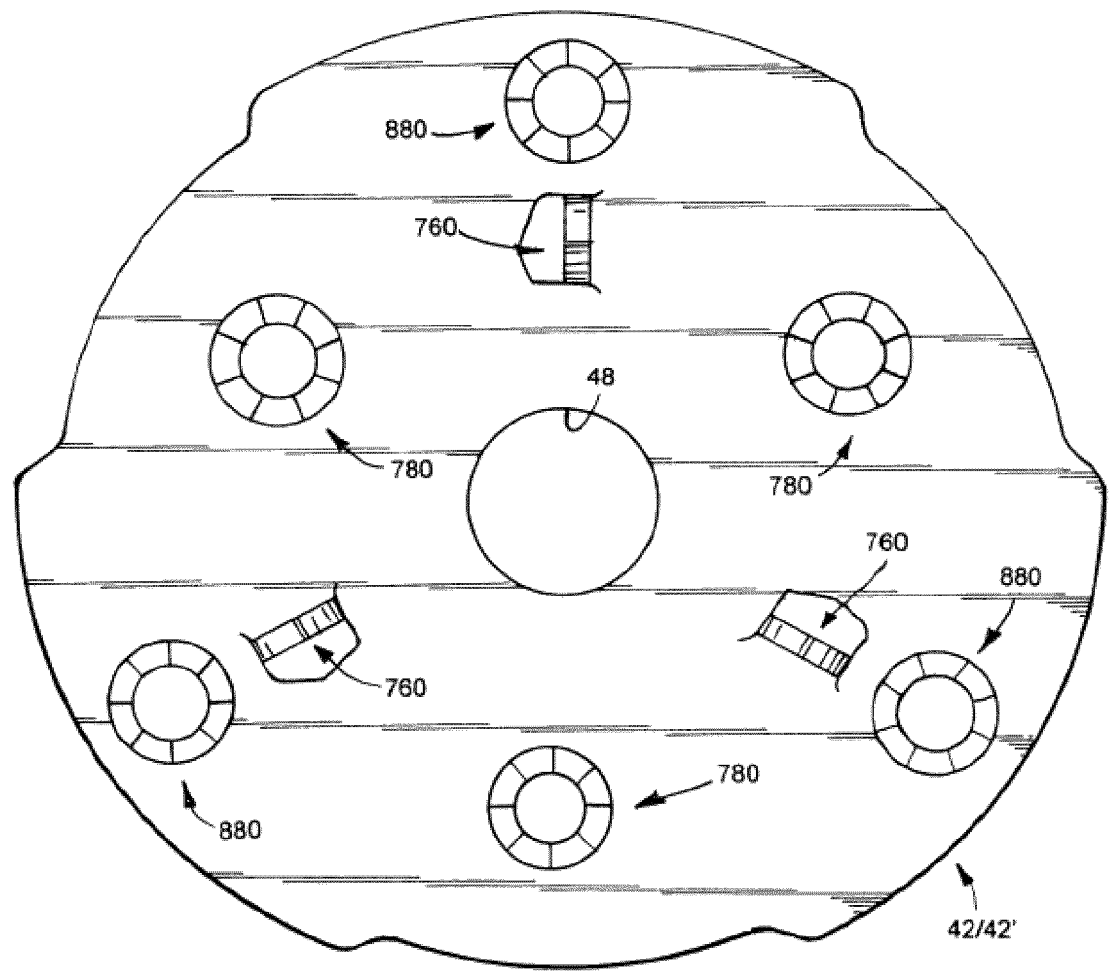
FIG. 21 is a plan view of yet another embodiment of metal plate used to form the compression spring illustrated in FIG. 2.

A still further form of fastener for mechanically fastening each plate 42/42' to the respective elastomeric spring pad 41 (FIG. 2) is illustrated in FIG. 21. The mechanical fasteners illustrated in FIG. 21 are designated generally by reference numeral 760. Suffice it to say, the fasteners 760 are designed substantially similar to the fasteners 660 discussed in detail above. In this embodiment, however, there are three equiangularly spaced fasteners 760. The three fasteners 760 are arranged about each plate 42/42' in concentric relation relative to the center of the plate 42/42' and in radially spaced relation from the center of the plate 42/42' by a distance greater than one-half the diameter of the opening 48 but less than one-half the predetermined diameter of the preform 50.

Arranged in alternating sequence with the fasteners 760 and at about the same radially spaced distance from the centerline of each plate 42/42' as fasteners 760, each plate 42/42' is furthermore provided with three surface incongruities 780 extending from the same surface of the plate 42/42' as the fasteners 760. The surface incongruities 780 are preferably of the type disclosed in U.S. Pat. No. 4,198,037 to D. G. Anderson; the applicable portions of which are incorporated herein by reference.

In one form, and as shown in FIG. 21, a second group or row of surface incongruities 880 extend from the same surface of the plate 42/42' as surface incongruities 780. Suffice it to say, the surface incongruities 880 are likewise preferably of the type disclosed in U.S. Pat. No. 4,198,037 to D. G. Anderson; the applicable portions of which are incorporated herein by reference. The second row of surface incongruities are radially spaced outwardly from the fasteners 760 and, in one form, in radially spaced alignment with the fasteners 760. In one form, and before the working process for the spring has begun, at least a part of each surface incongruity 880 can be radially spaced from the center of the plate 42/42' more than one-half the diameter of the preform 50 (FIG. 3). During operation of the spring 40 within the draft gear housing 12

(FIG. 1), the surface incongruities 880 operably combine with the fasteners 760 to limit radial expansion of the spring pad 41 outwardly toward an inner surface of the draft gear housing 12 whereby prolonging the usefulness of the spring 40 within the draft gear housing 12.

Figure 22:
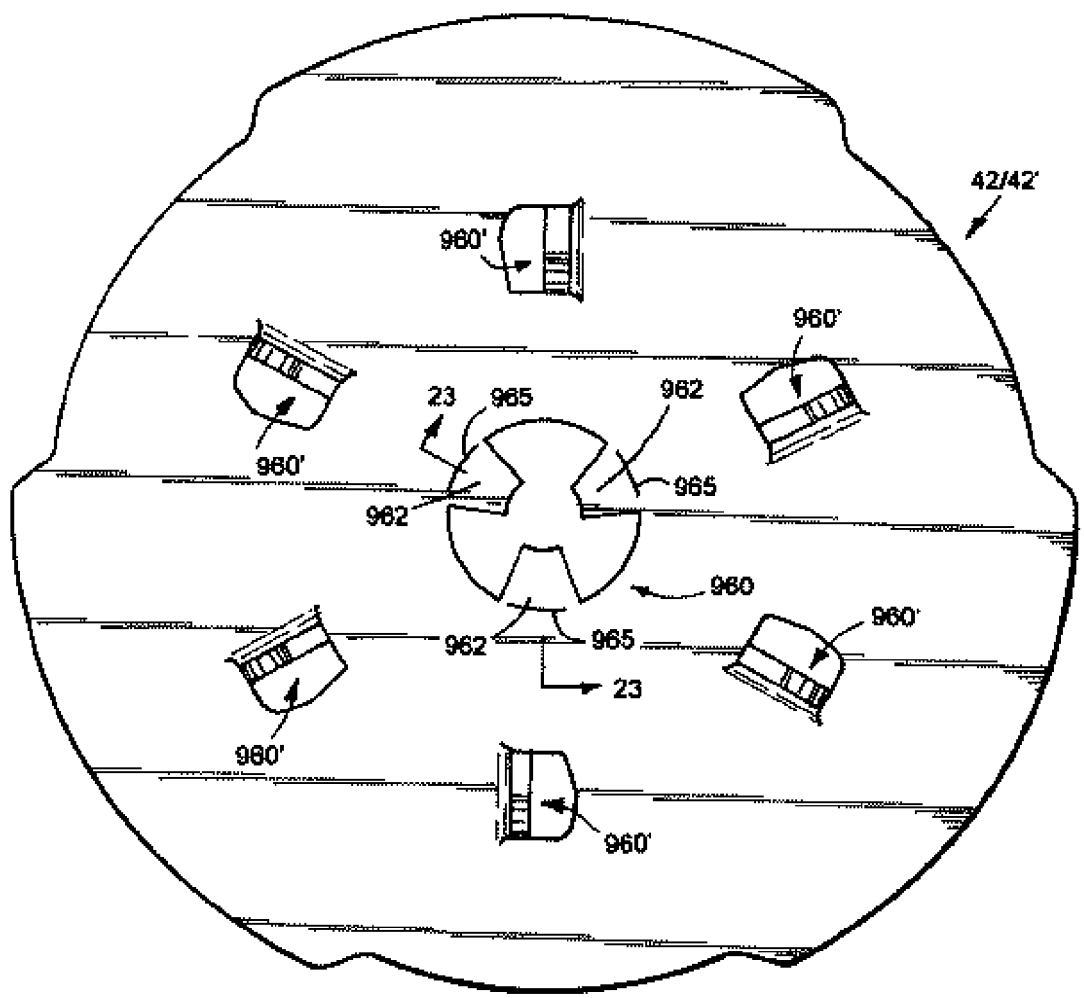
FIG. 22 is a plan view of another embodiment of metal plate used to form the compression spring illustrated in FIG. 2.
Figure 23:
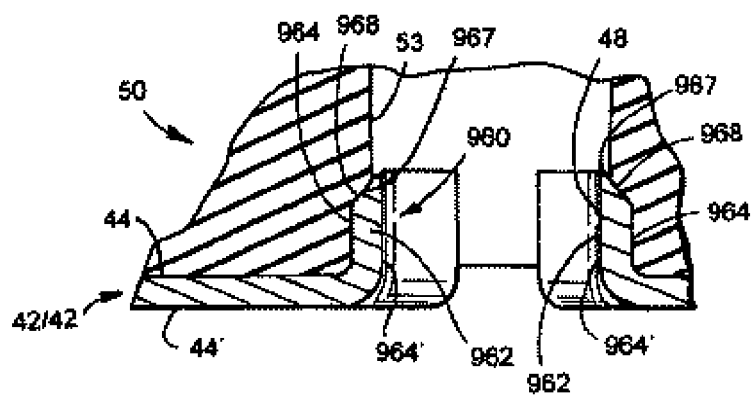
FIG. 23 is an enlarged sectional view taken along line 23-23 of FIG. 22.

Another form of fastener for mechanically securing or fastening each plate 42/42' to the respective elastomeric spring pad 41 is illustrated in FIGS. 22 and 23. The mechanical fasteners illustrated in FIG. 23 are designated generally by reference numeral 960. Fasteners 960 are formed as tabs or elements 962 and, as shown in FIG. 23, extend generally perpendicular relative to that planar face of the plate 42/42' adapted to be engaged by the spring pad of each spring. The tabs 962 are stamped from or die cast with each plate 42/42' and, as such, are integral with each plate 42/42'. In FIG. 22, the tabs or elements 962 are shown in an unbent or unformed state and are shown as being integral with the remainder of the plate 42/42'.

In the embodiment illustrated in FIG. 22, the tabs or elements 962 are arranged in radially spaced relation relative to each other and are provided adjacent to the center of each plate 42/42'. When formed, the tabs or elements 962 on each plate 42/42' are bent about a line or arc 965 in a direction generally normal to the major surfaces 44, 44' of each plate 42/42'. As shown in FIG. 23, each tab or element 962 preferably has first and second major surfaces 964, 964' extending parallel to each other and which are preferably separated by the same distance as opposed planar faces 44, 44' (FIG. 2) of each plate 42/42' (FIG. 2). Surfaces 964 and 964' can also have arcuate contours extending generally concentric relative to each other and separated by the same distance as opposed planar surfaces 44, 44' of each plate 42/42'. When formed, opposed inner surfaces of the tabs or elements 962 define the centralized opening 48 extending through each plate 42/42'. Suffice it to say, the opposed inner surfaces of the tabs or elements 962 are separated from each other by a distance slightly larger than the outer diameter of the guide rod 70 (FIG. 1). As such, the inner surfaces of the tabs or elements 962 slide along and are guided by the rod 70 to facilitate axial sliding movements of the springs 40 along the guide rod 70 (FIG. 1) in response to an axial force or energy being applied to the draft gear assembly 10 (FIG. 1).

In the illustrated embodiment, the outer surfaces of the bent tabs or elements 962 are separated by a distance slightly greater than the diameter of the axial bore 57 opening to opposite ends 52, 54 (FIG. 3) of the preform 50. As such, and after the plates 42/42' are arranged in the press P, the tabs or elements 962 are pressed into the bore 57 during the working step or process for forming the spring 40 (FIG. 2). In this regard, and as shown in FIG. 23, a distal end 967 of each tab or element 962 is preferably provided with a suitably angled or chamferred surface 968 whereby facilitating insertion and alignment of the fasteners 960 between the plates 42/42' and the bore 57 in the preform 50.

To further affix or secure each plate 42/42' to the elastomer, that face of each plate 42/42' adapted to contact the elastomer can further include a second series of fasteners 960' if so desired. The second series of fasteners 960' can take any of the fastener forms as described above, or obvious modifications thereof, or may constitute a series of surface incongruities as described above. In the embodiment illustrated in FIG. 22, such fasteners 960' (and/or surface incongruities) are preferably arranged about each plate 42/42' in concentric relation relative to the center of the plate 42/42' and in radially spaced relation from the center of the plate 42/42' by a distance radially spaced from the elements 962 but less than one-half the predetermined diameter of the preform 50.

When an axial compressive force is applied to the preform 50 whereby transmuting the preform 50 into elastomeric spring 40, the elastomer of the pad, having a hardness in the range of 40 to 45 on the Shore D hardness scale, radially expands and flows around the fasteners in whatever shape they are so designed with elastomer material of the preform passing between the radial shoulder on the fastener and the confronting planar face of the metal plate to establish a mechanical bond between the elastomer and the respective plate. In those embodiments described above having an aperture or opening associated with or arranged adjacent each fastener, and during the compression process, a portion of the elastomer material also tends to plastically deform and flows or pass into the apertures in the plates 42/42' whereby enhancing the mechanical bond formed between the elastomer and the respective plate.

The fasteners, in whatever form, serve to maintain the plates 42/42' in operable combination with the spring pad 41 (FIG. 2)(having a durometer hardness in the range of about 40 to 45 on the Shore D hardness scale) following the spring forming process and before the springs are arranged in the draft gear without having to require repeated axial compression between the plates 42/42' and the elastomeric spring pad 41 (FIG. 2). Research and development has surprisingly revealed an advantageous result which can be accomplished by the fasteners. That is, the fasteners projecting from the plates tend to limit the radial expansion of the elastomer when an axial force is applied thereto. Considering the 40 to 45 durometer hardness on the Shore D scale of the elastomer used to form the spring pad 41, coupled with the heat buildup occurring toward that end of the elastomeric spring stack 30 arranged adjacent to the friction clutch assembly 20, the ability of the fasteners on each plate to limit radial expansion of the elastomeric pad 41 advantageously limits the elastomer of the spring from rubbing against an inner surface of the draft gear housing 12, thus, prolonging the usefulness of the spring package 30.

From the foregoing, it will be observed that numerous modifications and variations can be made and effected without departing or detracting from the true spirit and novel concept of the present invention disclosure. Moreover, it will be appreciated, the present disclosure is intended to set forth exemplifications which are not intended to limit the disclosure to the specific embodiment illustrated. Rather, this disclosure is intended to cover by the appended claims all such modifications and variations as fall within the spirit and scope of the claims.

What is claimed:

1. A cold formed railcar spring comprising:
a spring formed from a preform of thermoplastic polyester elastomer having a durometer hardness ranging between about 40 and about 45 on the Shore D scale, with said preform having a selected initial axial length and a generally cylindrical shape of a predetermined diameter between first and second axial ends thereof and defining an axial bore opening to said first and second ends, with said preform and said bore being substantially uniform in cross section perpendicular to a central axis of said preform, and wherein the elastomer of said preform is such that, upon being axially compressed at least 30% of the initial axial length of said preform, said elastomer will permanently retain a substantial portion of the length reduction after being compressed and whereby said preform is thereafter transmuted into said spring for absorbing, dissipating and returning energy imparted thereto; and first and second metal plates adapted to be mechanically fastened at the first and second ends, respectively, of said preform, with each plate having a pair of generally parallel and planar surfaces defining a predetermined thickness therebetween and a generally centralized bore extending through each plate, with each plate further including a profiled periphery, and with each plate further including a plurality of radially spaced mechanical fasteners extending generally perpendicular to the planar surfaces of said plate, with a plurality of said fasteners being formed as an integral part of each plate and having first and second generally parallel surfaces along with a barb extending from a side of said fastener, and wherein said barb defines a radial shoulder extending generally parallel to and spaced from the planar surface of the plate arranged in abutting relation with the axial end of said spring member such that, upon axial compression of said preform onto said plate, said fastener is pressed axially inward of one end of said preform and with elastomer material of said preform passing between the radial shoulder on said barb on said fastener and said plate whereby mechanically interlocking said plate to one end of said preform, and wherein each fastener is oriented relative to the central axis of the preform to influence radial expansion of said spring during a working cycle of said spring.

2. The cold formed railcar spring according to claim 1, wherein each plate further includes a plurality of surface incongruities extending away from the same planar surface as said fasteners and arranged in alternating radial relation relative to said fasteners.

3. The cold formed railcar spring according to claim 1, wherein each fastener includes a shank portion and a head portion, with the shank portion of each fastener being joined to and extending from said plate, and with a size differentiation between said shank portion and said head portion defining the radial shoulder of said barb.

4. The cold formed railcar spring according to claim 3, wherein a distal end of the head portion of each fastener being is slanted to promote penetration of said fastener into the end of said preform upon axial compression of the preform.

5. The cold formed railcar spring according to claim 3, wherein the shank portion of each fastener has a line of weakness for allowing said fastener to separate from said plate during working of said spring.

6. The cold formed railcar spring according to claim 1, wherein each fastener has a generally rectangular cross-sectional configuration along a majority of the length thereof.

7. A cold formed railcar spring comprising:
a spring formed from a preform of thermoplastic polyester elastomer having a durometer hardness ranging between about 40 and about 45 on the Shore D scale, with said preform having a selected initial axial length and a generally cylindrical shape of a predetermined diameter between first and second axial ends thereof and defining an axial bore opening to said first and second ends, with said preform and said bore being substantially uniform in cross section perpendicular to a central axis of the preform, and wherein the elastomer of said preform is such that, upon being axially compressed at least 30% of the initial axial length of said preform, said elastomer will permanently retain a substantial portion of the length reduction after being compressed and whereby said preform is thereafter transmuted into said spring for absorbing, dissipating and returning energy imparted thereto; and first and second metal plates adapted to be mechanically fastened at the first and second ends, respectively, of said preform, with each plate having a pair of generally parallel and planar surfaces defining a predetermined thickness therebetween and a generally centralized bore extending through each plate, with each plate further including a profiled periphery, and wherein each plate further includes a plurality of radially spaced mechanical fasteners having first and second generally parallel major surfaces extending generally perpendicular to the planar surface on said plate and are offset from a central axis of each plate, and with the first and second major surfaces of the fasteners extending generally perpendicular to a line generally bisecting each plate into generally symmetrical halves to influence radial expansion of said spring during a working cycle of said spring, with each fastener having a barb extending from a side of said fastener and defining a radial shoulder extending generally parallel to and spaced from the planar surface of the plate arranged in abutting relation with one end of said preform such that, upon axial compression of said preform onto said plate, said fastener is pressed axially inward of one end of the preform until one of said planar surfaces on said plate contacts with said preform and elastomer material of said preform passes between the radial shoulder on said barb on said fastener and said plate so as to interlock one end of the preform with said plate.

8. The cold formed railcar spring according to claim 7, wherein each plate further includes a plurality of surface incongruities extending away from the same planar surface as said fasteners and arranged in alternating radial relation relative to said fasteners.

9. A cold formed railcar spring having a longitudinal axis, comprising:
a spring formed from a preform of thermoplastic polyester elastomer having a durometer hardness ranging between about 40 and about 45 on the Shore D scale, with said preform having an initial axial length and a generally cylindrical shape of a predetermined diameter between first and second axial ends thereof and defining an axial bore opening to said first and second ends, with said preform and said bore being substantially uniform in cross section perpendicular to a central axis of said preform, and wherein the elastomer of said preform is such that, upon being axially compressed at least 30% of the initial axial length of said preform, said elastomer will permanently retain a substantial portion of the length reduction after being compressed and whereby said preform is thereafter transmuted into said spring for absorbing, dissipating and returning energy imparted thereto; and first and second metal plates adapted to be mechanically fastened at the first and second ends, respectively, of said preform, with each plate having a pair of planar surfaces with a predetermined thickness therebetween and a generally centralized bore extending through each plate and defining a central axis which aligns with the central axis of said preform, with each plate further including a profiled periphery, and wherein each plate further includes a plurality of radially spaced fasteners having first and second generally parallel major surfaces extending generally perpendicular to the planar surface on said plate, and with the major surfaces of the fasteners extending generally parallel to a line generally bisecting each plate into generally symmetrical halves to inhibit radial expansion of said elastomeric spring during a working cycle of said spring, and with each fastener having a barb extending from a side of said fastener and defining a radial shoulder extending generally parallel to and spaced from the planar surface of the plate arranged in abutting relation with one end of said spring member such that, upon axial compression of said preform onto said plate, said fastener is pressed axially inward of one end of the preform until one of said planar surfaces on said plate contacts with said preform and elastomer material passes between the radial shoulder on said barb on said fastener and said plate so as to interlock one end of the preform with said plate.

10. The cold formed railcar spring according to claim 9, wherein the generally centralized bore defined by each plate has a closed marginal edge for guiding said plate along a guide bar during a working cycle of the spring.

11. The cold formed railcar spring according to claim 9, wherein a distal end of each fastener is spaced from the contacting planar surface of the respective plate by a distance equal to about 2.5 times to about 4 times the predetermined thickness of said plate.

12. The cold formed railcar spring according to claim 9, wherein each plate further includes a plurality of surface incongruities extending away from the same planar surface as said fasteners and arranged in alternating radial relation relative to said fasteners.

13. The cold formed railcar spring according to claim 9, wherein the barb extending from a side of said fastener extends radially inward toward the central axis of said preform.

14. The cold formed railcar spring according to claim 9, wherein each fastener includes a shank portion and a head portion, with the shank portion of each fastener being joined to and extending from said plate, and with a size differentiation between said shank portion and said head portion defining the radial shoulder on said barb.

15. The cold formed railcar spring according to claim 14, wherein a distal end of the head portion of each fastener is slanted to promote penetration of said fastener into the end of said preform upon axial compression of the preform.

16. The cold formed railcar spring according to claim 9, wherein each fastener has a generally rectangular cross-sectional configuration along a majority of the length thereof.

17. The cold formed railcar spring according to claim 9, wherein the barb extending from a side of said fastener extends radially outward away from the central axis of said preform.

* * * * *